United States Patent
Li et al.

(10) Patent No.: US 11,374,639 B2
(45) Date of Patent: Jun. 28, 2022

(54) METHOD AND APPARATUS FOR TRANSMISSION AND RECEPTION IN BACKHAUL LINK IN A WIRELESS COMMUNICATION SYSTEM

(71) Applicant: ASUSTek Computer Inc., Taipei (TW)

(72) Inventors: Ming-Che Li, Taipei (TW); Yu-Hsuan Guo, Taipei (TW); Meng-Hui Ou, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 16/225,292

(22) Filed: Dec. 19, 2018

(65) Prior Publication Data

US 2019/0199422 A1 Jun. 27, 2019

Related U.S. Application Data

(60) Provisional application No. 62/609,061, filed on Dec. 21, 2017, provisional application No. 62/609,216, filed on Dec. 21, 2017.

(51) Int. Cl.
*H04B 7/0408* (2017.01)
*H04W 72/04* (2009.01)
(Continued)

(52) U.S. Cl.
CPC ............. *H04B 7/0695* (2013.01); *H04B 7/04* (2013.01); *H04B 7/0408* (2013.01);
(Continued)

(58) Field of Classification Search
CPC ............. H04L 27/2655; H04L 72/1273; H04L 5/0082; H04L 47/826; H04W 52/146;
(Continued)

(56) References Cited

U.S. PATENT DOCUMENTS

2008/0013520 A1 1/2008 Liu
2009/0147757 A1* 6/2009 Naka .................... H04W 88/02
370/336

(Continued)

FOREIGN PATENT DOCUMENTS

| CN | 103314539 A | 9/2013 |
| EP | 2366264 | 9/2011 |
| WO | 2017/194218 | 11/2017 |

OTHER PUBLICATIONS

Nokia et al: "On the wireless relay operation in NR", 3GPP Draft; RI-165031, 3rd Generation Partnership Project (3GPP), Mobile Competence Centre ; 650, Route Des Lucioles ; F-06921 Sophia-Antipolis Cedex :France vol. RAN WG1, No. Nanjing, P.R. China; May 23, 2016-May 27, 2016, May 13, 2016 (May 13, 2016), XP051090124, Retrieved from the Internet: URL: http: //www.3gpp. org/ftp/tsg_ran/WG1_RL1/TSGR1_85/Docs/.

(Continued)

*Primary Examiner* — Asad M Nawaz
*Assistant Examiner* — Jason A Harley
(74) *Attorney, Agent, or Firm* — Cooper Legal Group, LLC

(57) ABSTRACT

A method and apparatus are disclosed from the perspective of a first network node. In one embodiment, the method includes the first network node transmitting a second transmission to a UE (User Equipment) in at least a first symbol of a first TTI (Transmission Time Interval). The method further includes the first network node transmitting a first transmission to a second network node in at least a second symbol of a second TTI, wherein the first TTI is TTI-level aligned to the second TTI and the first symbol is at least partially overlapped with the second symbol in time domain.

22 Claims, 29 Drawing Sheets

(51) Int. Cl.
*H04W 16/28* (2009.01)
*H04L 5/00* (2006.01)
*H04W 16/14* (2009.01)
*H04W 8/24* (2009.01)
*H04B 7/04* (2017.01)
*H04B 7/06* (2006.01)
*H04W 72/12* (2009.01)
*H04B 7/0413* (2017.01)
*H04W 92/20* (2009.01)

(52) U.S. Cl.
CPC ......... *H04B 7/0617* (2013.01); *H04L 5/0023* (2013.01); *H04L 5/0032* (2013.01); *H04L 5/0082* (2013.01); *H04W 16/28* (2013.01); *H04W 72/046* (2013.01); *H04W 72/0446* (2013.01); *H04W 72/1273* (2013.01); *H04B 7/0413* (2013.01); *H04L 5/0048* (2013.01); *H04L 5/0055* (2013.01); *H04W 92/20* (2013.01)

(58) Field of Classification Search
CPC ......... H04W 72/1289; H04W 72/1205; H04W 56/001; H04B 7/2606
USPC .................................................. 370/330, 252
See application file for complete search history.

(56) References Cited

U.S. PATENT DOCUMENTS

| | | | |
|---|---|---|---|
| 2013/0272189 A1* | 10/2013 | Lee | H04B 7/155 370/315 |
| 2015/0156769 A1* | 6/2015 | Mazzarese | H04W 72/0413 370/329 |
| 2016/0081076 A1* | 3/2016 | Zhang | H04L 5/0035 370/336 |
| 2016/0105903 A1* | 4/2016 | Hessler | H04W 72/1231 455/450 |
| 2016/0119095 A1* | 4/2016 | Lee | H04W 16/00 370/329 |
| 2016/0128095 A1* | 5/2016 | Damnjanovic | H04L 5/0087 370/336 |
| 2016/0234857 A1* | 8/2016 | Chen | H04L 5/0044 |
| 2016/0353475 A1* | 12/2016 | Au | H04L 5/0042 |
| 2017/0230086 A1* | 8/2017 | Chen | H04B 7/024 |
| 2017/0324459 A1* | 11/2017 | Koskela | H04B 7/0617 |
| 2018/0014296 A1* | 1/2018 | Li | H04W 72/10 |
| 2018/0014298 A1* | 1/2018 | Sun | H04L 1/189 |
| 2018/0077717 A1* | 3/2018 | Janse van Rensburg | H04B 7/0617 |
| 2018/0132235 A1* | 5/2018 | Hosseini | H04L 27/0006 |
| 2018/0213551 A1* | 7/2018 | Wang | H04W 56/0045 |
| 2019/0174495 A1* | 6/2019 | Sahlin | H04L 5/003 |
| 2019/0199422 A1* | 6/2019 | Li | H04B 7/0617 |
| 2019/0199571 A1* | 6/2019 | John Wilson | H04J 11/0056 |

OTHER PUBLICATIONS

Qualcomm:"Impact of Access Link Design for Access/Backhaul Relays", 3GPP Draft; R1-1610190_Impact of Access Link Design for Access Backhaul Relays, 3rd Generation Partnership Project (3GPP), Mobile Competence Centre ; 650, Route Des Lucioles ; F-06921 Sophia-Antipolis vol. RAN WG1, No. Lisbon, Portugal; Oct. 10, 2016-Oct. 14, 2016, Oct. 9, 2016 (Oct. 9, 2016), XP051150210, Retrieved from the Internet: URL: http://www.3gpp.org/ftp/Meetings_3GPP_SYNC/RAN1/Docs/.

European Search Report in corresponding EP Application No. 18213878.4, dated Feb. 22, 2019.

Corresponding Chinese Patent Application No. 201811557102.8, Office Action dated Apr. 15, 2021. English Translation.

\* cited by examiner (a) Digital beamforming (b) Analogue beamforming

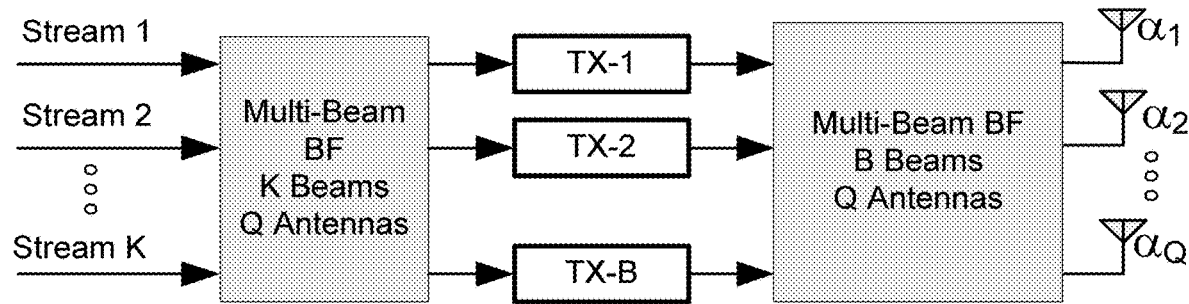
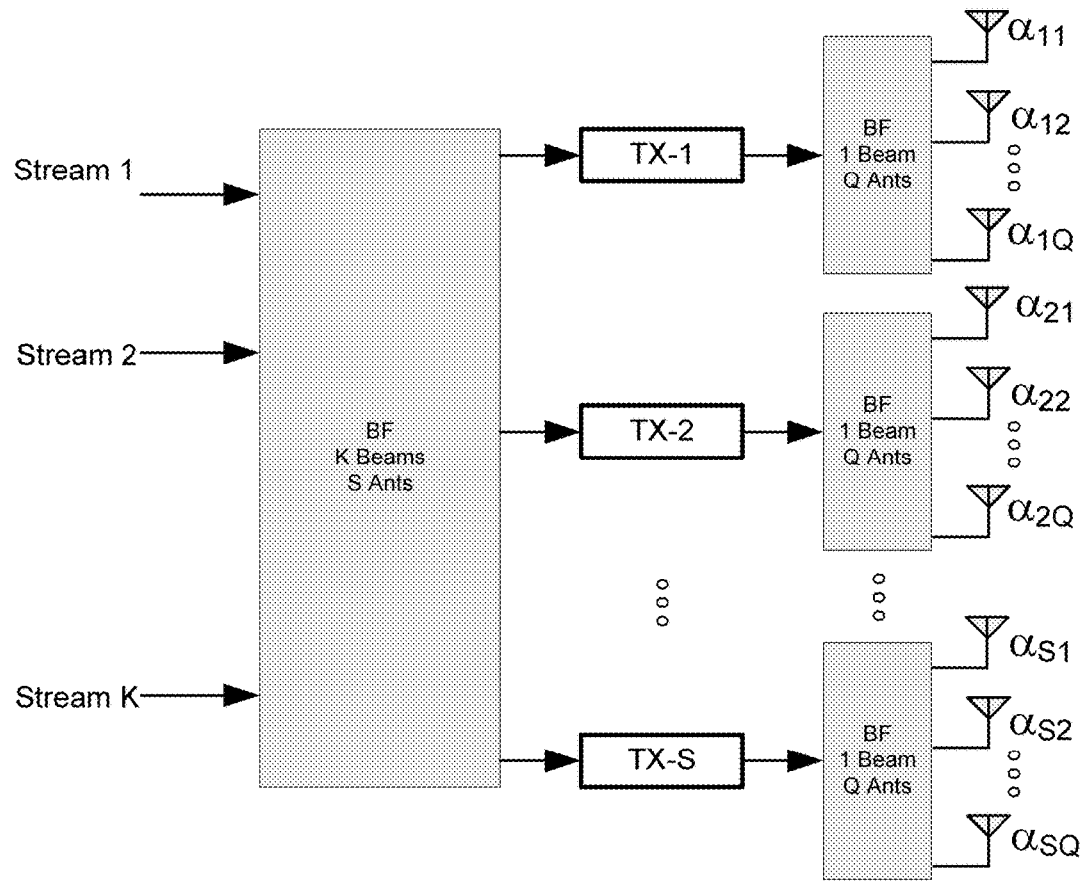
(c) Hybrid beamforming: Left = fully connected, Right = sub-array
FIG. 5C

| Property | Definition |
|---|---|
| Relay definition | The relay node is wirelessly connected to the radio-access network via a donor cell. |
| Usage of spectrum | 1. inband, in which case the eNB -relay link shares the same carrier frequency with relay-UE links.<br>2. outband, in which case the eNB-relay link does not operate in the same carrier frequency as relay-UE links. E.g. Type 1a Relay |
| Duplexing scheme | 1. FDD, in which the eNB-relay link operates in paired spectrum<br>2. TDD, in which the eNB-relay link operates in unpaired spectrum |
| Knowledge in the UE | 1. transparent, in which case the UE is not aware of whether or not it communicates with the network via the relay.<br>2. non-transparent, in which case the UE is aware of whether or not it is communicating with the network via the relay. |
| Relaying strategy | 1. A relay may be part of the donor cell, e.g. Type 2 Relay.<br>2. A relay may control cells of its own, e.g. Type 1 Relay. |

FIG. 17 (PRIOR ART)

| SubframeConfigurationTDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | | D | | | | U | |
| 1 | | | | | U | | | | | | D |
| 2 | | | | | | D | | | | U | D |
| 3 | | | | | U | D | | | | | D |
| 4 | | | | | U | D | | | | U | D |
| 5 | 2 | | | U | | | | | | D | |
| 6 | | | | | D | | | | U | | |
| 7 | | | | U | | D | | | D | | |
| 8 | | | | | D | | | | U | | D |
| 9 | | | | U | D | D | | | D | | |
| 10 | | | | | | D | | | U | D | D |
| 11 | 3 | | | | U | | | | D | | D |
| 12 | | | | | U | | | | D | D | D |
| 13 | 4 | | | | U | | | | | | D |
| 14 | | | | | U | | | | D | | D |
| 15 | | | | | U | | | | | D | D |
| 16 | | | | | U | | | | D | D | D |
| 17 | | | | | U | D | | | D | D | D |
| 18 | 6 | | | | | U | | | | | D |

FIG. 18 (PRIOR ART)

(normal cyclic prefix, $\Delta f = 15\,kHz$)

| Configuration | DL-StartSymbol | End symbol index |
|---|---|---|
| 0 | 1 | 6 |
| 1 | 2 | 6 |
| 2 | 3 | 6 |

FIG. 19A (PRIOR ART)

(normal cyclic prefix, $\Delta f = 15\,kHz$)

| Configuration | Start symbol index | End symbol index |
|---|---|---|
| 0 | 0 | 6 |
| 1 | 0 | 5 |

FIG. 19B (PRIOR ART)

METHOD AND APPARATUS FOR TRANSMISSION AND RECEPTION IN BACKHAUL LINK IN A WIRELESS COMMUNICATION SYSTEM

CROSS-REFERENCE TO RELATED APPLICATIONS

The present Application claims the benefit of U.S. Provisional Patent Application Ser. Nos. 62/609,061 and 62/609,216 filed on Dec. 21, 2017, the entire disclosures of which are incorporated herein in its entirety by reference.

FIELD

This disclosure generally relates to wireless communication networks, and more particularly, to a method and apparatus for transmission and reception in backhaul link in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first network node. In one embodiment, the method includes the first network node transmitting a second transmission to a UE (User Equipment) in at least a first symbol of a first TTI (Transmission Time Interval). The method further includes the first network node transmitting a first transmission to a second network node in at least a second symbol of a second TTI, wherein the first TTI is TTI-level aligned to the second TTI and the first symbol is at least partially overlapped with the second symbol in time domain.

BRIEF DESCRIPTION OF THE DRAWINGS

FIGS. 5A-5C provide exemplary illustrations of three types of beamforming.

FIG. 17 is a table according to one exemplary embodiment.

FIG. 18 is a table according to one exemplary embodiment.

FIGS. 19A-B are tables according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93 bis #23][NR] Deployment scenarios", NTT DOCOMO; 3GPP RAN2 #94 meeting minute; TS 5G.213 V1.9, "KT 5G Physical layer procedures (Release 1)"; TS 5G.321 V1.2, "KT 5G MAC protocol specification (Release 1)"; TS 5G.211 V2.6, "KT 5G Physical channels and modulation (Release 1)"; TS 5G.331 V1.0, "KT 5G Radio Resource Control (RRC) Protocol specification (Release 1)"; R2-162251, "RAN2 aspects of high frequency New RAT", Samsung; R2-163879, "RAN2 Impacts in HF-NR", MediaTeK; R2-162210, "Beam level management ⇔ Cell level mobility", Samsung; R2-163471, "Cell concept in NR", CATT; TS 36.300 V14.4.0, "E-UTRA and E-UTRAN; Overall description; Stage 2"; TS 36.814 V9.2.0, "E-UTRA; Further advancements for E-UTRA physical layer aspects"; TS 36.216 V14.0.0, "E-UTRA; Physical layer for relaying operation"; R1-102421, "Consideration on DL backhaul channel design", LGE; RP-171880, "Study on Integrated Access and Backhaul for NR"; Final Report of 3GPP TSG RAN WG1 #85 v1.0.0 (Nanjing, China, 23-27 May 2016); Final Report of 3GPP TSG RAN WG1 #86 bis v1.0.0 (Lisbon, Portugal, 10-14 Oct. 2016); Final Report of 3GPP TSG RAN WG1 #AH1 NR v1.0.0 (Spokane, USA, 16-20 Jan. 2017); Final Report of 3GPP TSG RAN WG1 #88 bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH_NR2 v1.0.0 (Qingdao, China, 27-30 Jun. 2017); and Final Chairman's Note of 3GPP TSG RAN WG1 Meeting #90 (Prague, Czech Republic, 21-25 Aug. 2017). The standards and documents listed above are hereby expressly incorporated by reference in their entirety.

Figure 1:
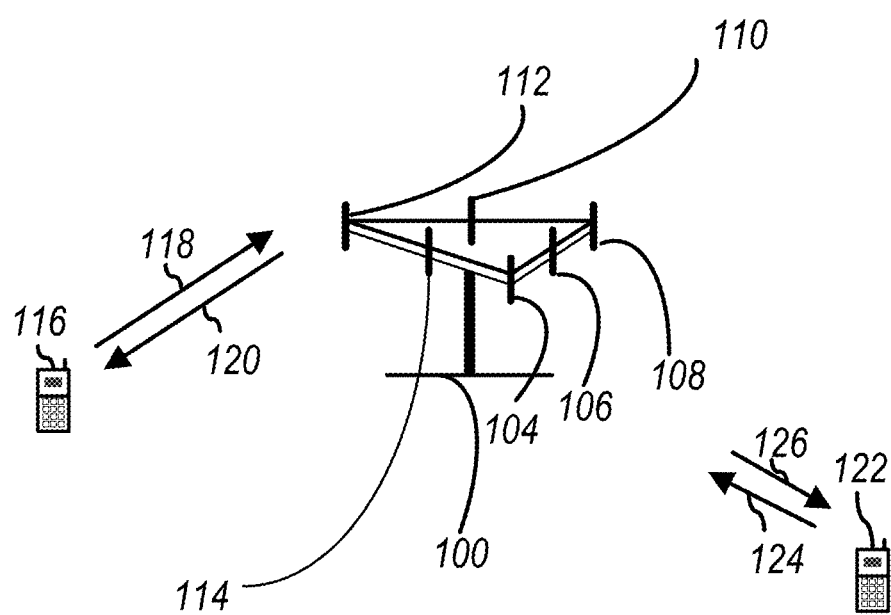
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
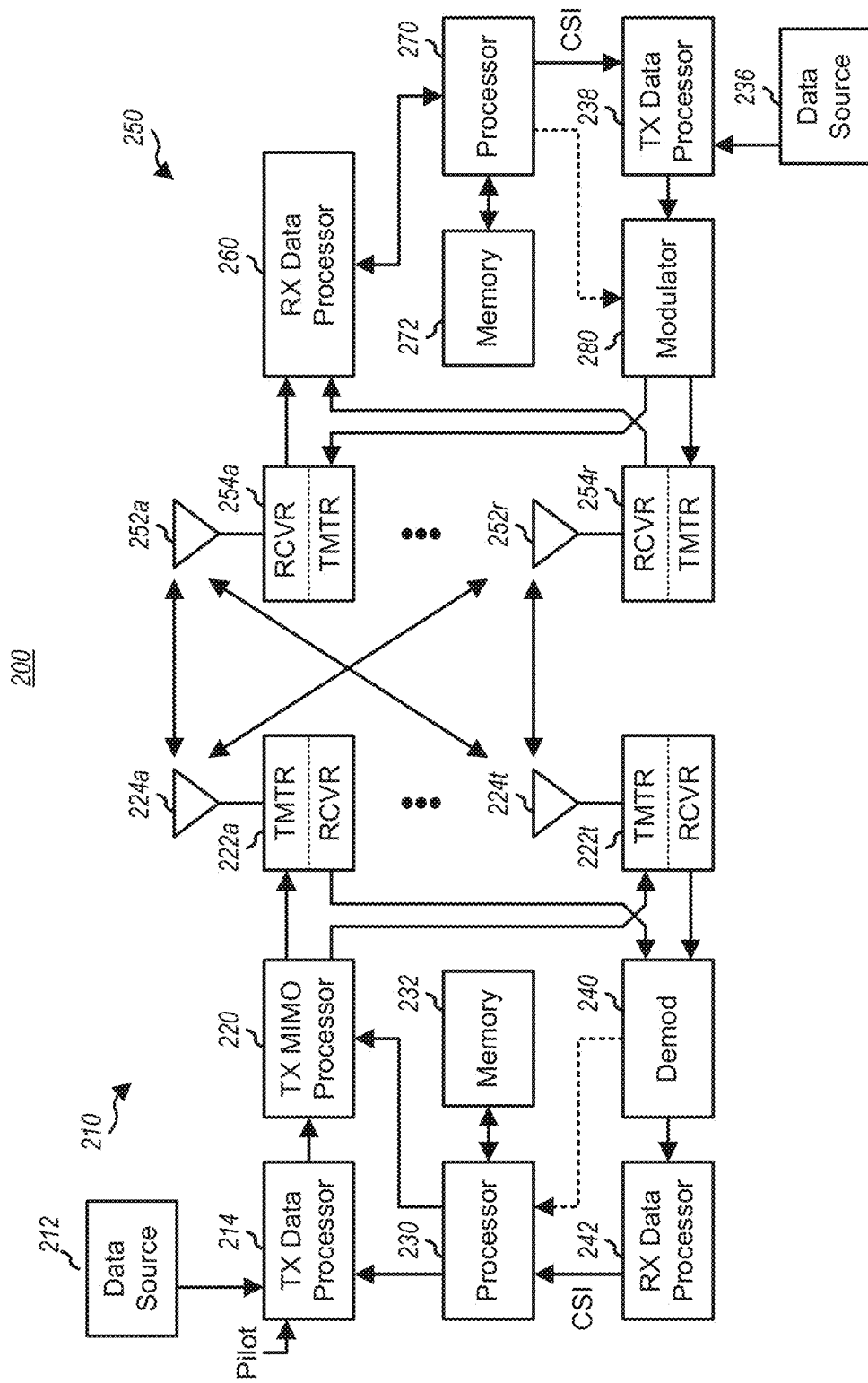
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
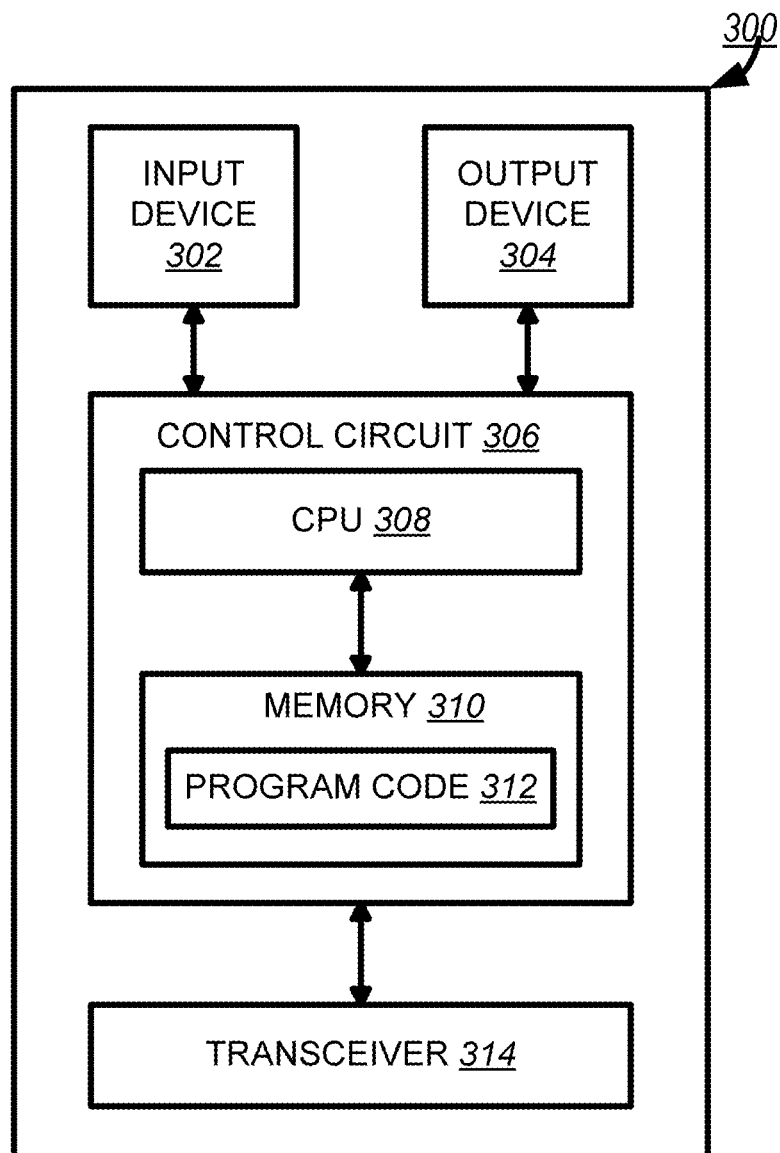
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
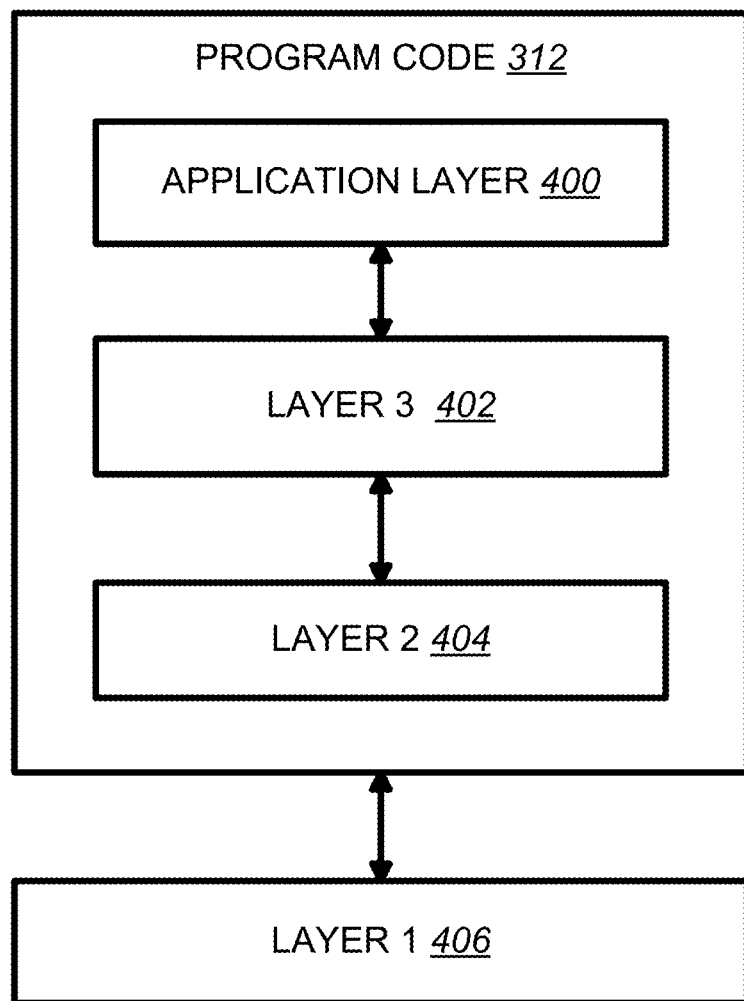
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
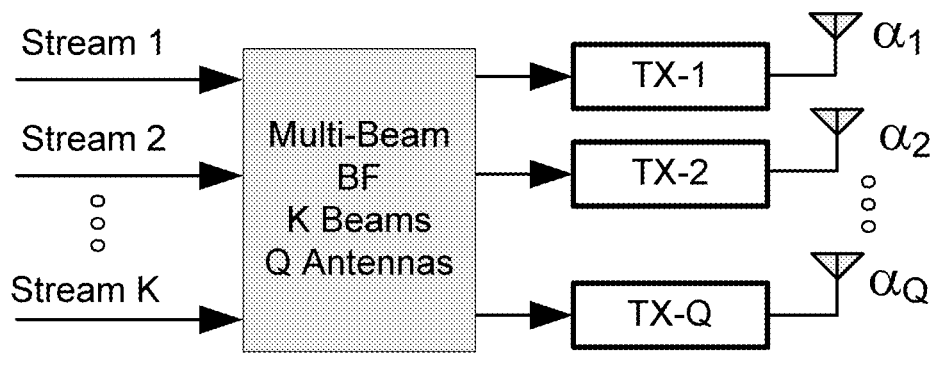
Figure 5B:
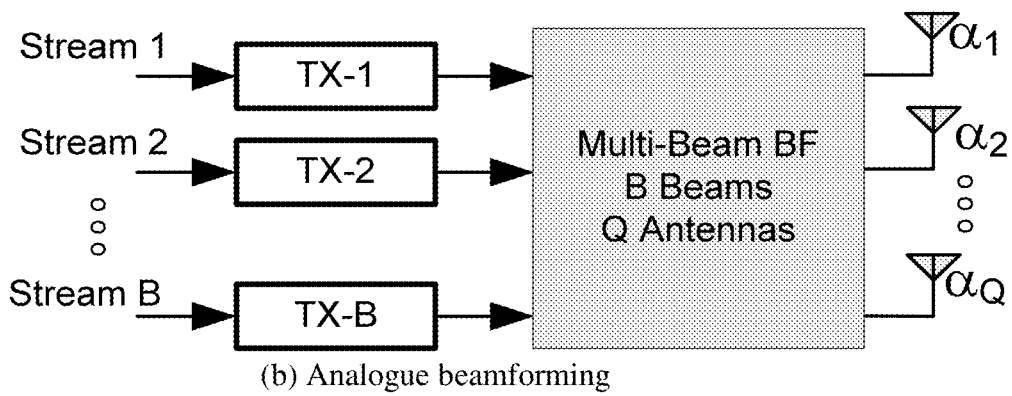

FIGS. 5A-5C provide exemplary illustrations of the three types of beamforming.

Figure 6:
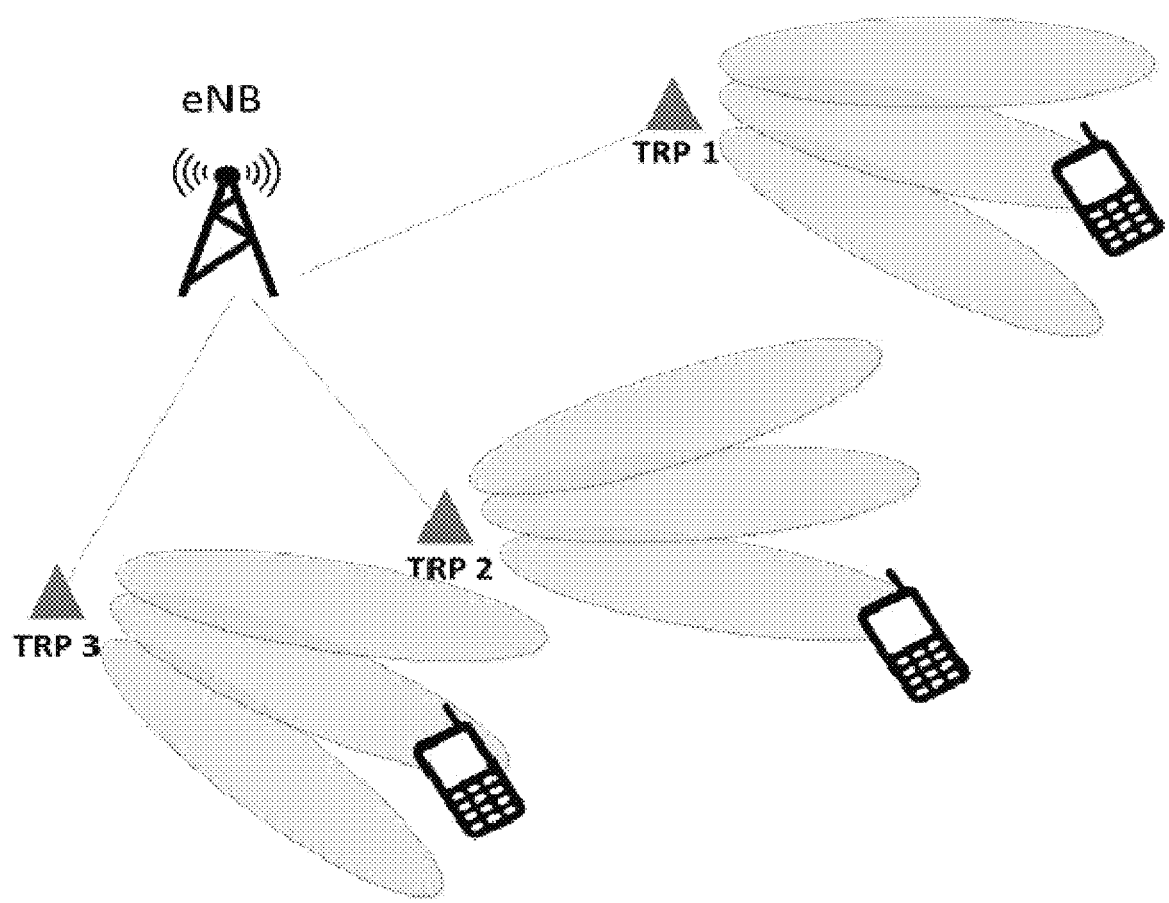
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
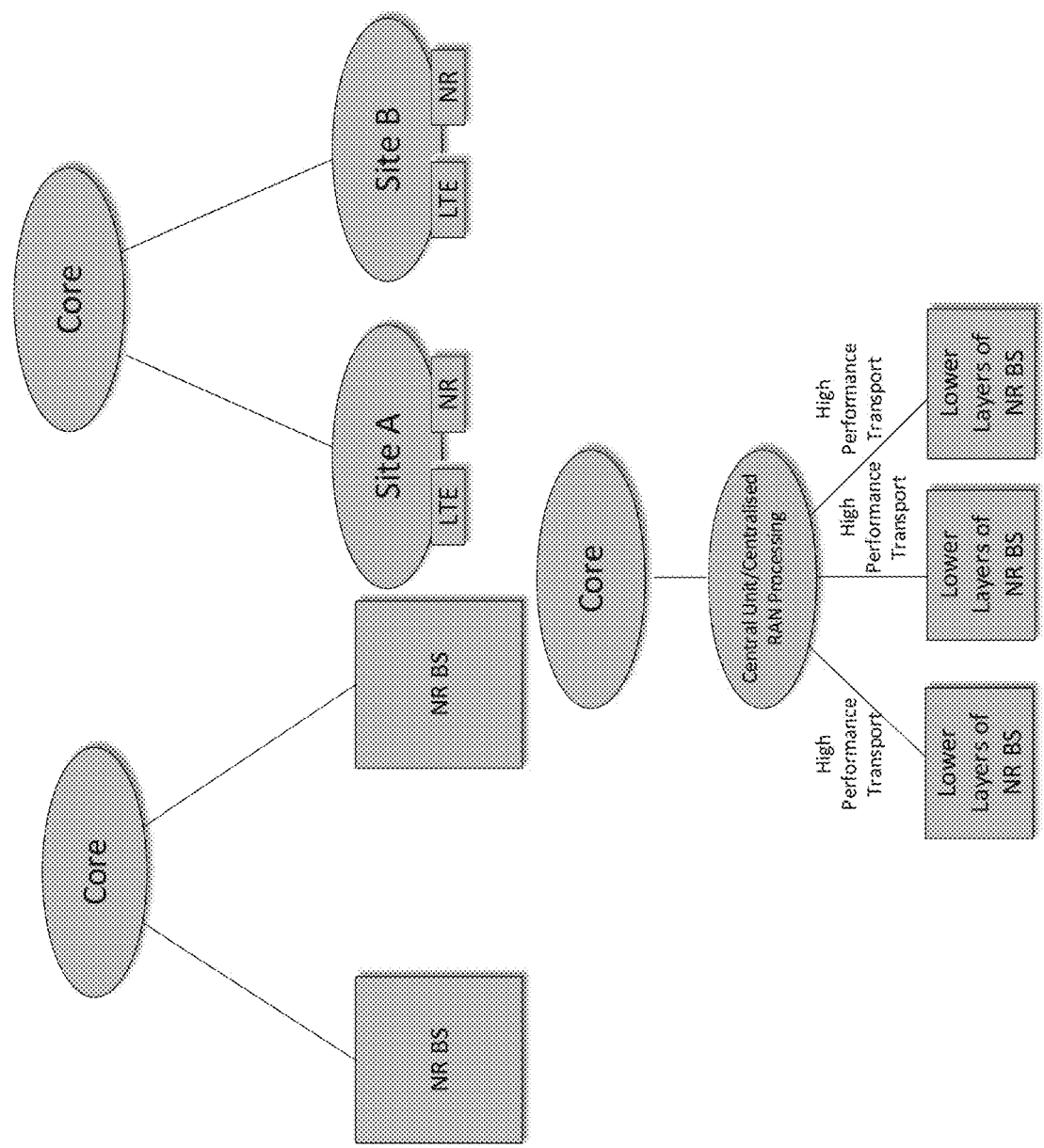
FIGS. 7 and 8 are reproduction of figures of 3GPP R2-160947.
Figure 8:
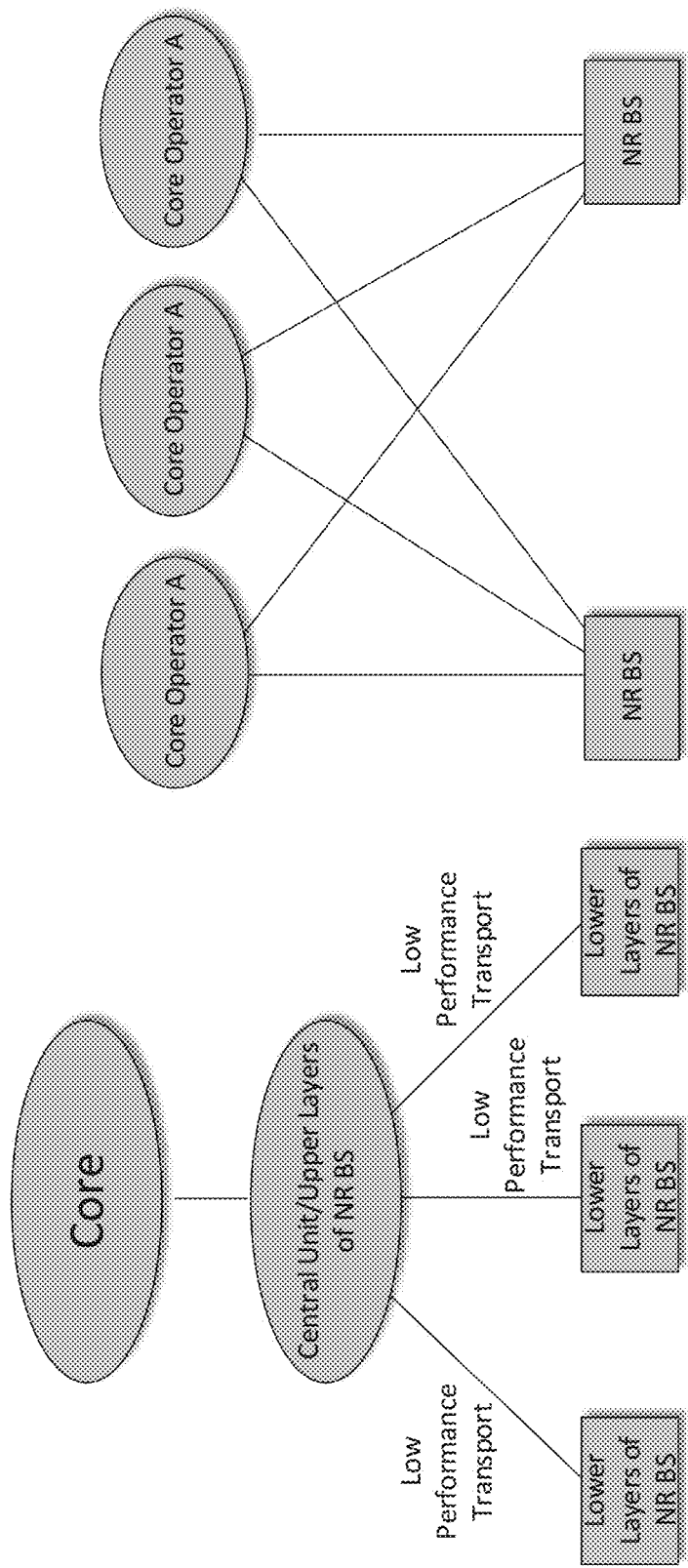

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
Macro cell only deployment
Heterogeneous deployment
Small cell only deployment Based on 3GPP RAN2 #94 meeting minutes, 1 NR eNB corresponds to 1 or many TRPs. Two levels of network controlled mobility:
RRC driven at "cell" level.
Zero/Minimum RRC involvement (e.g. at MAC/PHY)

Figure 9:
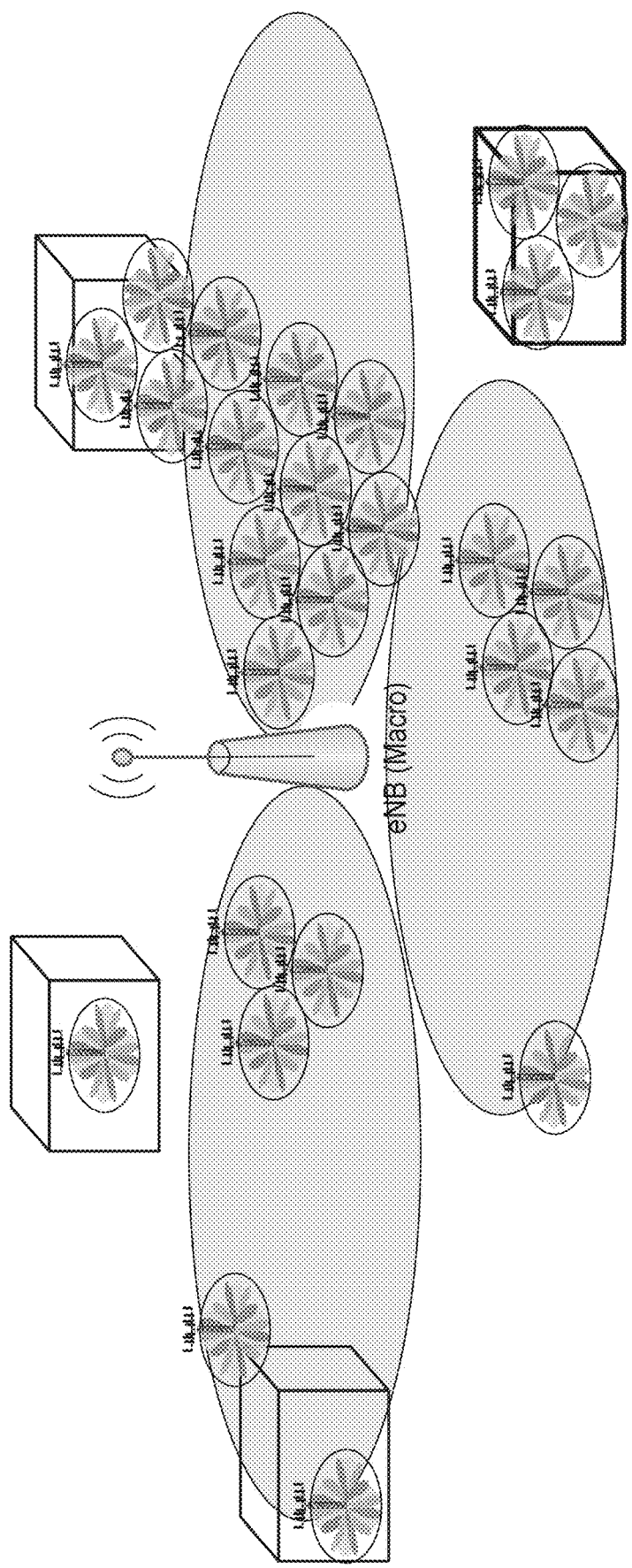
FIG. 9 shows an exemplary deployment with single TRP cell.
Figure 10:
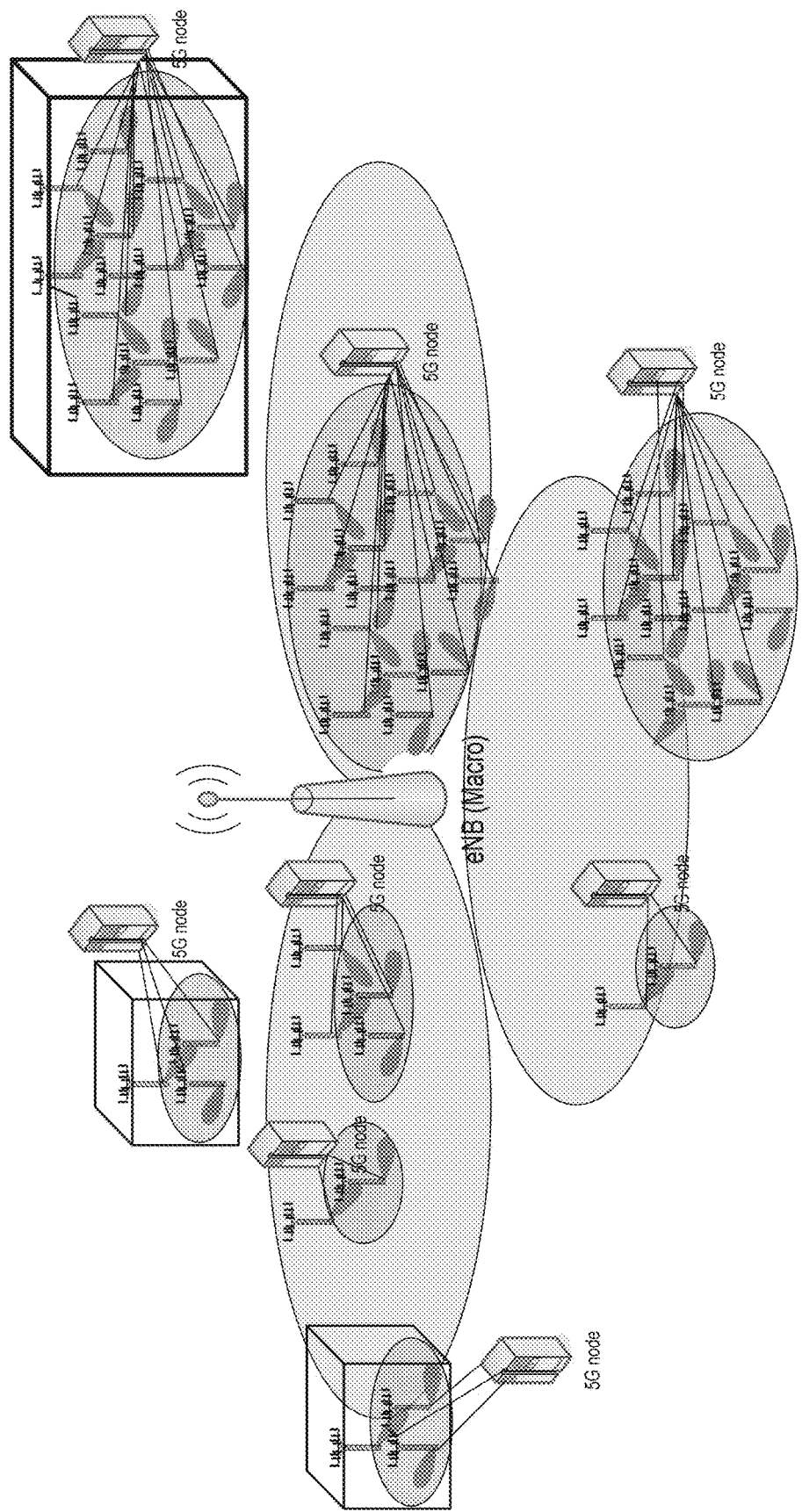
FIG. 10 shows an exemplary deployment with multiple TRP cells.
Figure 11:
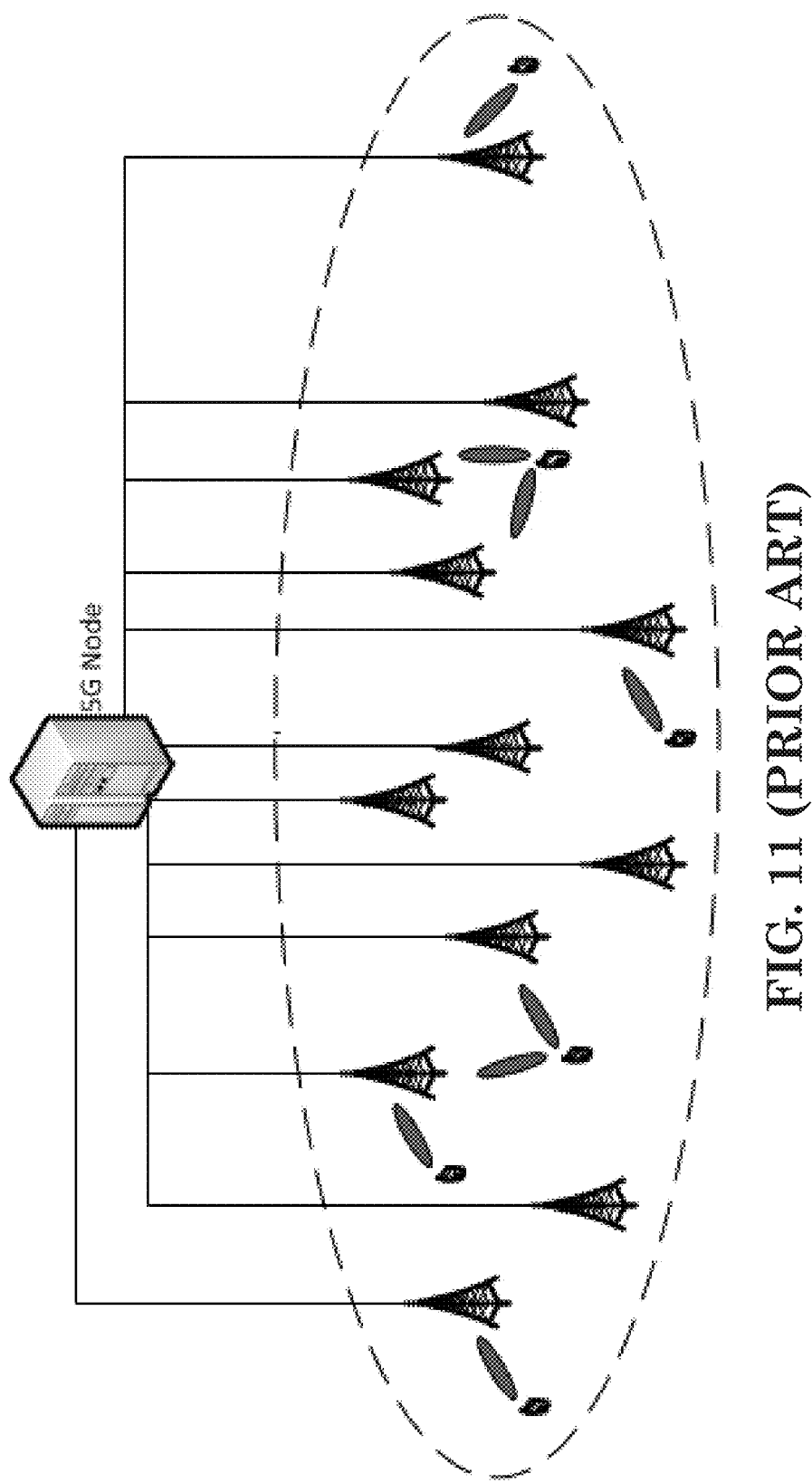
FIG. 11 shows an exemplary 5G cell comprising a 5G node with multiple TRPs.
Figure 12:
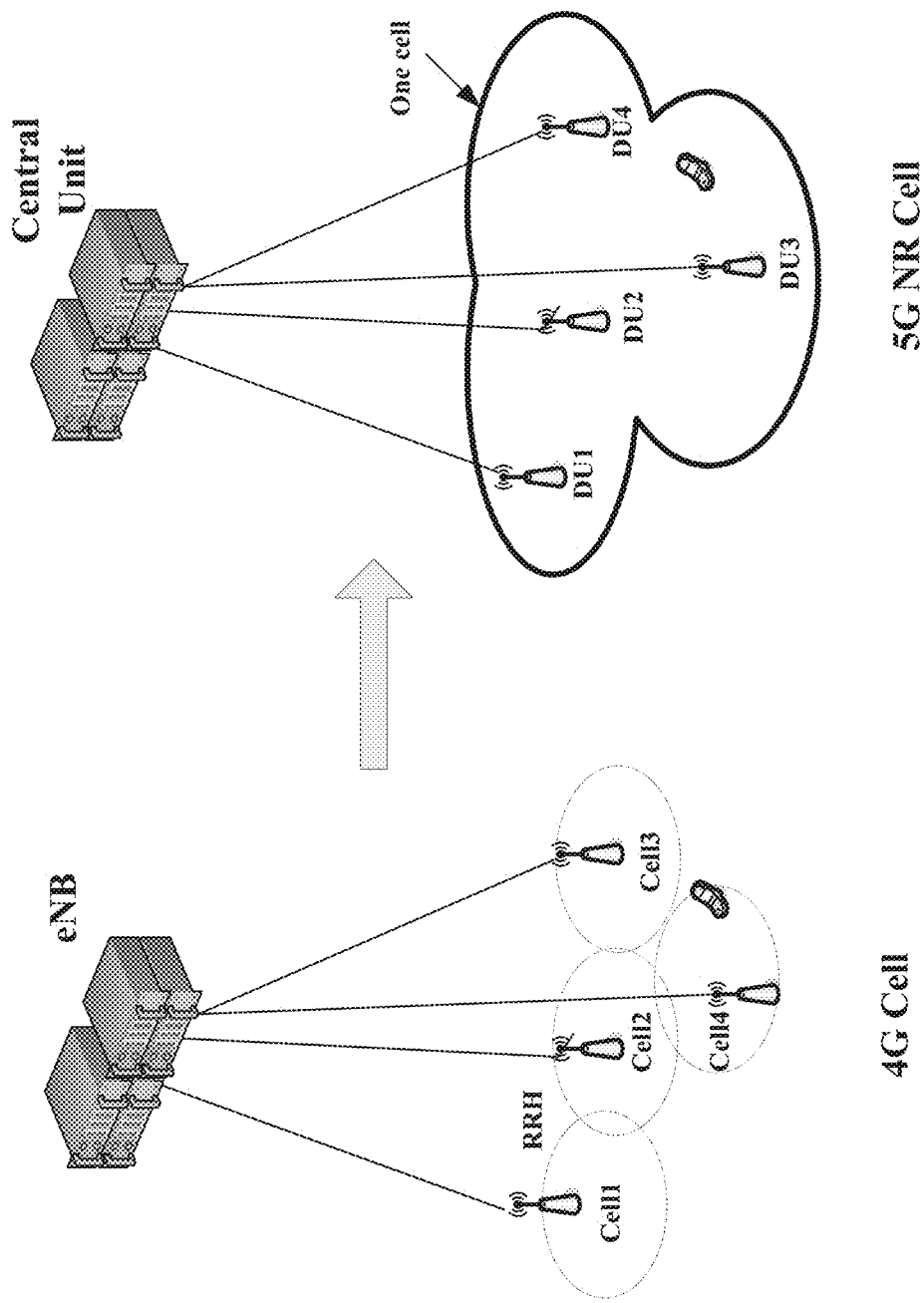
FIG. 12 shows an exemplary comparison between a LTE cell and a NR cell.

FIGS. 9 to 12 show some examples of the concept of a cell in 5G NR. FIG. 9 is a reproduction of a portion of FIG. 1 of 3GPP R2-163879, and shows exemplary different deployment scenarios with single TRP cell. FIG. 10 is a reproduction of a portion of FIG. 1 of 3GPP R2-163879, and shows exemplary different deployment scenarios with multiple TRP cells. FIG. 11 is a reproduction of FIG. 3 of 3GPP R2-162210, and shows an exemplary 5G cell comprising a 5G node with multiple TRPs. FIG. 12 is a reproduction of FIG. 1 of 3GPP R2-163471, and shows an exemplary comparison between a LTE cell and a NR cell.

Figure 16:
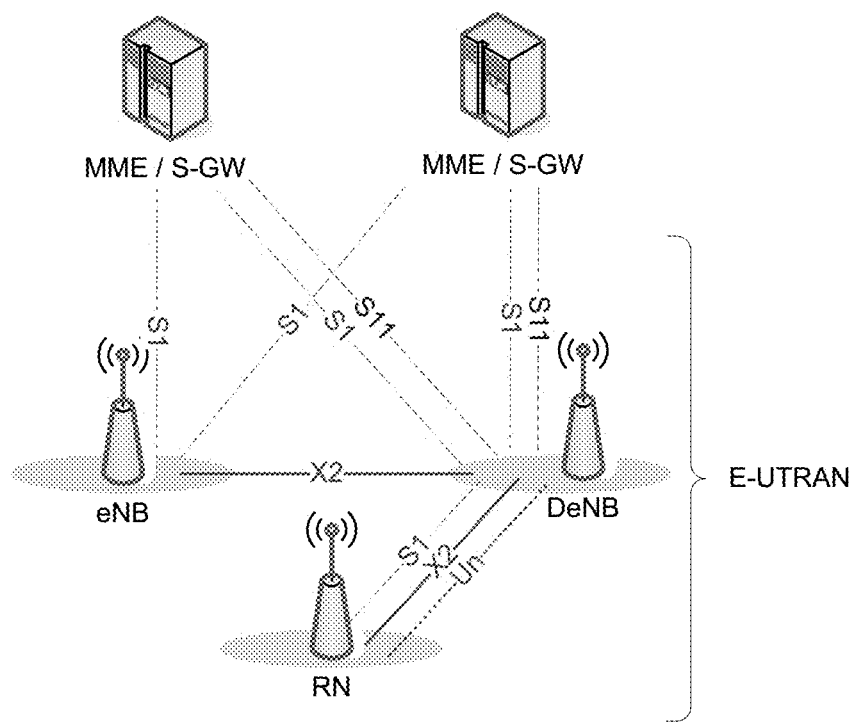
FIG. 16 is a reproduction FIG. 4-1 of 3GPP TS 36.300 V14.4.0.

In LTE (as discussed in 3GPP TS 36.300), E-UTRAN supports a relay node (RN) wirelessly connecting to a Donor eNB (DeNB) via Un interface as shown in FIG. 16 (which is a reproduction FIG. 4-1 of 3GPP TS 36.300 V14.4.0). RN configures MBSFN subframes for subframes configured for DeNB-to-RN transmission (as discussed in the LTE-Advanced Relay presentation dated Oct. 18, 2011). RN does not allow UE-to-RN transmissions in subframes for RN-to-DeNB transmissions.

3GPP TS 36.814 specifies properties and classifications of the relay as shown in FIG. 17. As discussed in 3GPP TS 36.814, due to the relay transmitter causing interference to its own receiver, simultaneous eNodeB-to-relay and relay-to-UE transmissions on the same frequency resource may not be feasible unless sufficient isolation of the outgoing and incoming signals is provided.

General principle for resource partitioning at the relay are as follows:
eNB→RN and RN→UE links are time division multiplexed in a single carrier frequency (only one is active at any time)
RN→eNB and UE→RN links are time division multiplexed in a single carrier frequency (only one is active at any time)

As discussed in 3GPP TS 36.216, resource multiplexing between access link and backhaul link follows semi-static scheduling as follows:
Downlink subframes configured for eNB-to-RN transmission shall be configured as MBSFN subframes by the relay node.
For frame structure type 1, a subframe configured for eNB-to-RN transmission is a subframe satisfying $[(10 \cdot n_f + \lfloor n_s/2 \rfloor) \bmod 8] \in \Delta_{BSC}$.
A subframe n is configured for RN-to-eNB transmission if subframe n−4 is configured for eNB-to-RN transmission.
For frame structure type 2, the subframes that can be configured for eNB-RN transmission are listed in the table in FIG. 18.

Figure 20:
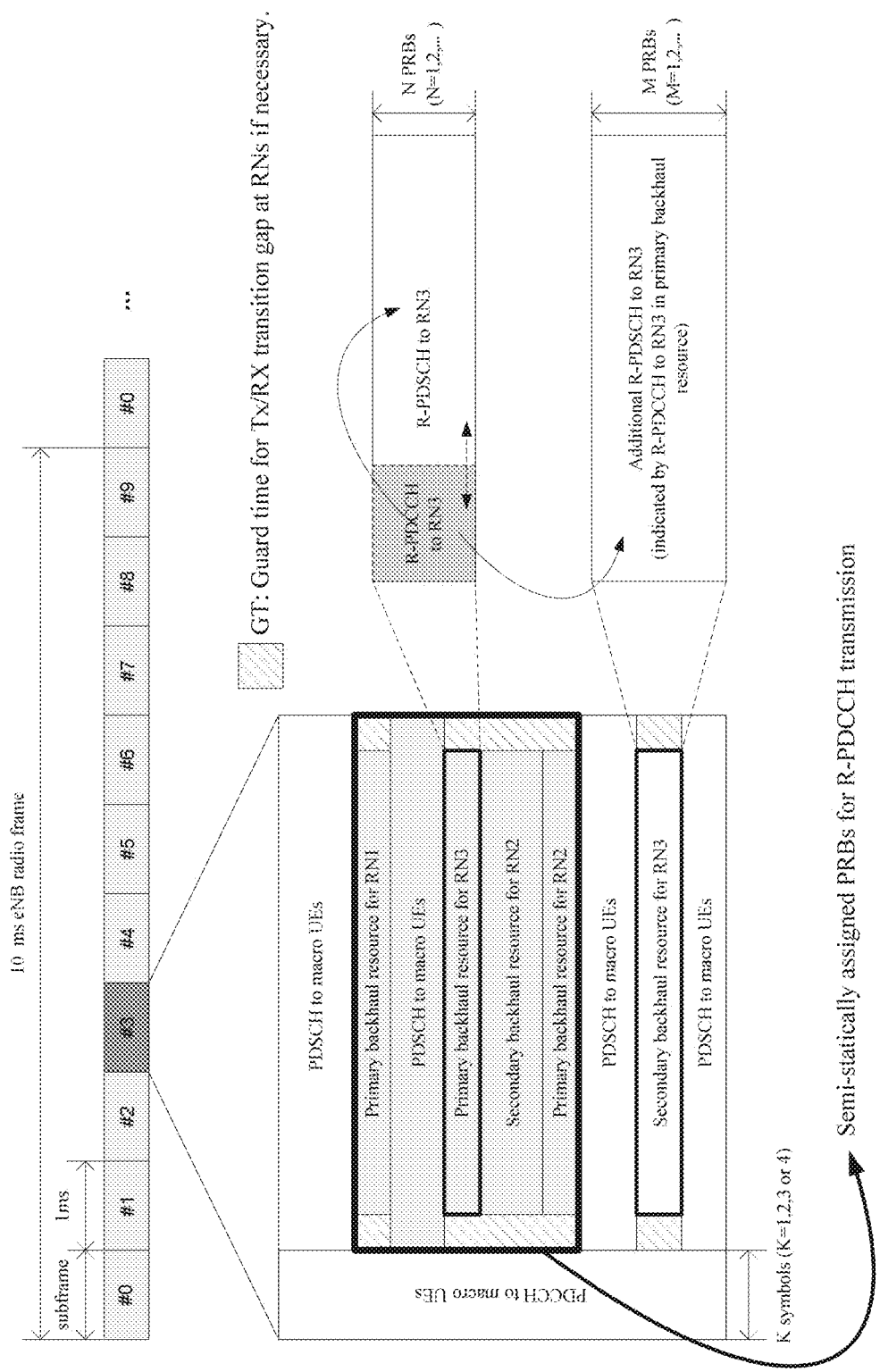
FIG. 20 is a reproduction of FIG. 1 of 3GPP R1-102421.

As discussed in 3GPP TS 36.216, the eNB-to-RN transmissions shall be restricted to a subset of the OFDM (Orthogonal Frequency Division Multiplexing) symbols in a slot.
The starting and ending OFDM symbols respectively in the first slot of a subframe is given in the table in FIG. 19A. The parameter DL-StartSymbol is configured by higher layers.
The starting and ending OFDM symbols respectively in the second slot of a subframe is given in the table in FIG. 19B.
As discussed in 3GPP TS 36.216, as for RN-to-eNB data transmission, the relay node shall not expect HARQ (Hybrid Automatic Repeat Request) feedback on PHICH (Physical Hybrid-ARQ Indicator Channel). ACK (Acknowledgement) shall be delivered to higher layers for each transport block transmitted on PUSCH (Physical Uplink Shared Channel). (No R-PCFICH, No R-PHICH) PUCCH (Physical Uplink Control Channel) resource for HARQ-ACK and SR (Scheduling Request) are configured via higher layer.
The relay node shall monitor the set of configured VRBs (Virtual Resource Blocks) in the first slot for an R-PDCCH (Relay Physical Downlink Control Channel) containing a downlink assignment. The relay node shall monitor the set of configured VRBs in the second slot for an R-PDCCH containing an uplink grant. R-PDSCH can be in the first slot and/or second slot. FIG. 20 (which is a reproduction of FIG. 1 of 3GPP R1-102421) shows an exemplary instance of eNB-to-RN transmission.

Figure 21:
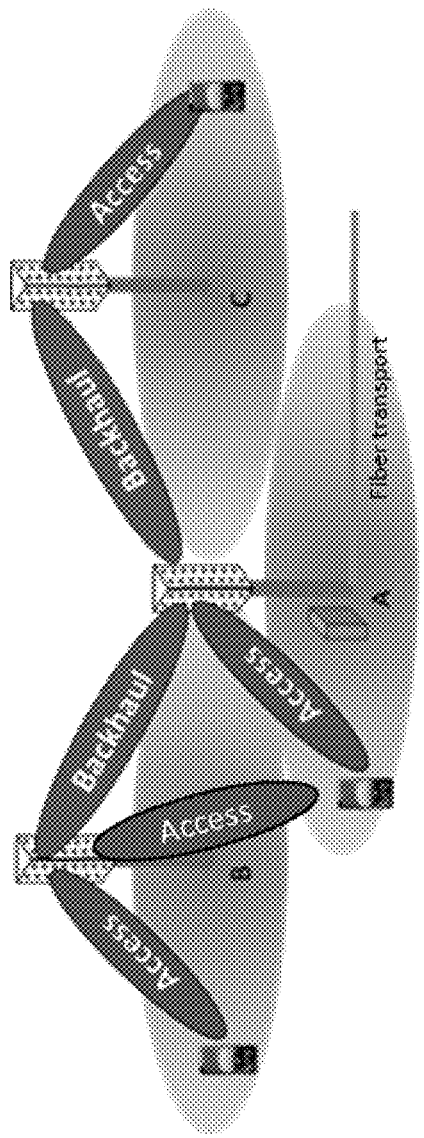
FIG. 21 is a reproduction of FIG. 1 of 3GPP RP-171880.

3GPP RP-171880 states:
One of the potential technologies targeted to enable future cellular network deployment scenarios and applications is the support for wireless backhaul and relay links enabling flexible and very dense deployment of NR cells without the need for densifying the transport network proportionately.
Due to the expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner by building upon many of the control and data channels/ procedures defined for providing access to UEs. An example illustration of a network with such integrated access and backhaul links is shown in FIG. 1, where relay nodes (rTRPs) can multiplex access and backhaul links in time, frequency, or space (e.g. beam-based operation).
[FIG. 1 of 3GPP RP-171880, entitled "Integrated access and backhaul links", is reproduced as FIG. 21]

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present RRC-based handover mechanisms due to the larger time-scales required for completion of the procedures compared to short-term blocking. Overcoming short-term blocking in mmWave systems may require fast RAN-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

There are some agreements on beam management and/or group common PDCCH in the RAN1 #85 meeting, as stated in the Final Report of 3GPP TSG RAN WG1 #85 v1.0.0 (Nanjing, China, 23-27 May 2016) as follows:
Agreements:
Following three implementations of beamforming are to be studied in NR
  Analog beamforming
  Digital beamforming
  Hybrid beamforming
  Note: The physical layer procedure design for NR can be agnostic to UE/TRP with respect to the beamforming implementations employed at TRP/UE, but it may pursue beamforming implementation specific optimization not to lose efficiency
RAN1 studies both multi-beam based approaches and single-beam based approaches for these channels/signals/measurement/feedback
  Initial-access signals (synchronization signals and random access channels)
  System-information delivery
  RRM measurement/feedback
  L1 control channel
  Others are FFS
  Note: The physical layer procedure design for NR can be unified as much as possible whether multi-beam or single-beam based approaches are employed at TRP at least for synchronization signal detection in stand-alone initial access procedure
  Note: single beam approach can be a special case of multi beam approach
  Note: Individual optimization of single beam approach and multiple beam approach is possible
Multi-beam based approaches
  In Multi-beam based approaches, multiple beams are used for covering a DL coverage area and/or UL coverage distance of a TRP/a UE
  One example of multi-beam based approaches is beam sweeping:
    When beam sweeping is applied for a signal (or a channel), the signal (the channel) is transmitted/received on multiple beams, which are on multiple time instances in finite time duration
    Single/multiple beam can be transmitted/received in a single time instance
  Others are FFS
Single-beam based approaches
  In single-beam based approaches, the single beam can be used for covering a DL coverage area and/or UL coverage distance of a TRP/a UE, similarly as for LTE cell-specific channels/RS
[ . . . ]
Agreements:
RAN1 to study the beamforming procedures and their system impacts at least for multi beam based approach
  Physical layer procedures for beamforming optimizing different metrics such as overheads and latencies in multi beam and single beam based approaches
  Physical layer procedures in multi beam based approach that require beam training, i.e. steering of transmitter and/or receiver beams
    E.g. Periodic/Aperiodic downlink/uplink TX/RX beam sweeping signals, where periodic signals may be semi-statically or dynamically configured (FFS)
    E.g. UL sounding signals
    Other example is not precluded
Agreements:
Both intra-TRP and inter-TRP beamforming procedures are considered.
Beamforming procedures are considered with/without TRP beamforming/beam sweeping and with/without UE beamforming/beam sweeping, according to the following potential use cases:
  UE movement, UE rotation, beam blocking:
    Change of beam at TRP, same beam at UE
    Same beam at TRP, change of beam at UE
    Change of beam at TRP, change of beam at UE
  Other cases are not precluded
Agreement: Study the Necessity of QCL and Measurement Assumptions for Antenna Ports in NR
There are some agreements on beam management and/or group common PDCCH in the RAN1 #86 bis meeting, as stated in the Final Report of 3GPP TSG RAN WG1 #86 bis v1.0.0 (Lisbon, Portugal, 10-14 Oct. 2016) as follows:
Working assumptions:
Beam management procedures can utilize at least the following RS type(s):
  RS defined for mobility purpose at least in connected mode
    FFS: RS can be NR-SS or CSI-RS or newly designed RS
    Others are not precluded
  CSI-RS:
    CSI-RS is UE-specifically configured
      Multiple UE may be configured with the same CSI-RS
    The signal structure for CSI-RS can be specifically optimized for the particular procedure Note: CSI-RS can also be used for CSI acquisition
Other RS could also be considered for beam management such as DMRS and synchronization signals
[ . . . ]
Working Assumption:
  The followings are defined as Tx/Rx beam correspondence at TRP and UE:
  Tx/Rx beam correspondence at TRP holds if at least one of the following is satisfied:
    TRP is able to determine a TRP Rx beam for the uplink reception based on UE's downlink measurement on TRP's one or more Tx beams.
    TRP is able to determine a TRP Tx beam for the downlink transmission based on TRP's uplink measurement on TRP's one or more Rx beams
  Tx/Rx beam correspondence at UE holds if at least one of the following is satisfied:
    UE is able to determine a UE Tx beam for the uplink transmission based on UE's downlink measurement on UE's one or more Rx beams.
    UE is able to determine a UE Rx beam for the downlink reception based on TRP's indication based on uplink measurement on UE's one or more Tx beams.
  More refined definition can still be discussed
[ . . . ]
There are some agreements on beam management and/or group common PDCCH in the RAN1 WG1 #AH1_NR meeting, as stated in the Final Report of 3GPP TSG RAN WG1 #AH1_NR v1.0.0 (Spokane, USA, 16-20 Jan. 2017) as follows:
Agreements:
NR supports a 'group common PDCCH' carrying information of e.g. the slot structure.
  If the UE does not receive the 'group common PDCCH' the UE should be able to receive at least PDCCH in a slot, at least if the gNB did not transmit the 'group common PDCCH'.
  The network will inform through RRC signalling the UE whether to decode the 'group common PDCCH' or not
  Common does not necessarily imply common per cell.
  Continue the discussion on the detailed content of the 'group common PDCCH' including usage for TDD and FDD
  The term 'group common PDCCH' refers to a channel (either a PDCCH or a separately designed channel) that carries information intended for the group of UEs.
Agreements:
The staring position of downlink data in a slot can be explicitly and dynamically indicated to the UE.
  FFS: signaled in the UE-specific DCI and/or a 'group-common PDCCH'
  FFS: how and with what granularity the unused control resource set(s) can be used for data
Agreements:
The UE will have the possibility to determine whether some blind decodings can be skipped based on information on a 'group common PDCCH' (if present).
  FFS: if the data starting position is signaled on the group common PDCCH, the UE may exploit this information to skip some blind decodings
  FFS: if the end of the control resource set is signaled on the 'group common PDCCH', the UE may exploit this information to skip some blind decodings
  FFS: how to handle the case when there is no 'group common PDCCH' in a slot When monitoring for a PDCCH, the UE should be able to process a detected PDCCH irrespective of whether the 'group common PDCCH' is received or not
Agreements:
'Slot format related information'
  Information from which the UE can derive at least which symbols in a slot that are 'DL', 'UL' (for Rel-15), and 'other', respectively
  FFS: if 'other' can be subdivided into 'blank', 'sidelink', etc
  FFS: 'Control resource set duration'
    FFS: Indicates the duration of the control resource set(s)
    FFS: Can help the UE skip some of the semi-statically configured blind decodings. If not received, the UE performs all blind decodings.
There are some agreements on beam management and/or group common PDCCH in the RAN1 WG1 #88 bis meeting, as stated in the Final Report of 3GPP TSG RAN WG1 #88 bis v1.0.0 (Spokane, USA, 3-7 Apr. 2017) as follows:
Agreements:
From UE signaling perspective,
  The higher layer signalling for the semi-static assignment of DL/UL transmission direction for NR can achieve at least the followings
    A periodicity where the configuration applies;
      FFS: Detailed periodicity set;
      FFS: how to achieve the signaling of periodicity
    A subset of resources with fixed DL transmission;
      FFS: The subset of resources can be assigned in granularity of slot and/or symbol;
    A subset of resources with fixed UL transmission;
      Resources with fixed UL transmission happens in the ending part of the periodicity is supported;
      FFS: The subset of resources can be assigned in granularity of slot and/or symbol;
    FFS: Other resources not indicated as "fixed UL" or "fixed DL" or "reserved/blank" can be considered as "flexible resource", where transmission direction can be changed dynamically.
There are some agreements on beam management and/or group common PDCCH in the RAN1 WG1 #89 meeting, as stated in the Final Report of 3GPP TSG RAN WG1 #89 v1.0.0 (Hangzhou, China, 15-19 May 2017) as follows:
Agreements:
The following beam grouping criteria are considered:
  A1 (based on Alt 1): Different TRP TX beams reported for the same group can be received simultaneously at the UE.
  A2 (based on Alt 2): Different TRP TX beams reported for different groups can be received simultaneously at the UE.
  Down selection of the beam grouping criteria by next meeting
  FFS in addition to the above grouping criteria, the following grouping criteria can be considered
    C1 (in combination with A1): Different TRP TX beams reported for different groups cannot be received simultaneously at the UE.
    C2 (in combination with A2): Different TRP TX beams reported for the same group cannot be received simultaneously at the UE.
Agreements:
The SFI transmitted in a group-common PDCCH can indicate the slot format related information for one or more slots The slot format related information informs the UEs of the number of slots and the slot format(s) related information of those slots
  FFS: how to interpret the SFI when the UE is configured with multiple bandwidth parts
  FFS: details for UE behaviour
FFS: A UE may be configured to monitor for at most one group-common PDCCH carrying slot format related information (SFI) in a slot
Agreements:
Regarding to the periodicity that included in the higher layer signalling for the semi-static assignment of DL/UL transmission direction for NR, at least the following values are supported:
  [Roughly 0.125 ms, roughly 0.25 ms,] 0.5 ms, 1 ms, 2 ms, 5 ms, 10 ms;
    Each periodicity is supported for particular SCS(s)/slot duration(s)
  FFS: details
Agreements:
In 'Slot format related information', 'other' is at least:
  'Unknown'
    UE shall not assume anything for the symbol with 'Unknown' by this information
      FFS: UE behavior when the UE receives the information for the symbol from SFI and broadcast DCI and/or UE-specific DCI and/or semi-static signaling/configuration
    FFS: 'Empty'
      UEs can use this resource for interference measurement
      UE may assume there is no transmission
  There are some agreements on beam management and/or group common PDCCH in the RAN1 WG1 #AH_NR2 meeting, as stated in the Final Report of 3GPP TSG RAN WG1 #AH_NR2 v1.0.0 (Qingdao, China, 27-30 Jun. 2017) as follows:
Agreements:
In 'Slot format related information', 'Empty' is not indicated explicitly.
Note: RAN1 specification ensures that UE(s) is/are aware of which resources can be for 'gap for DL-UL switching' and/or 'gap'
Note: RAN1 specification ensures that UE(s) is/are aware of which resources are for 'CSI/interference measurement'.
Agreements:
UE is configured with a CORESET to monitor group-common PDCCH.
When configured, the group-common PDCCH follows the same CORESET configuration (e.g., REG-to-CCE mapping) of the CORESET.
  A group-common PDCCH is formed by an integer number of CCEs.
The CORESET for the monitored group-common PDCCH carrying SFI can be the same or different from the CORESET for the monitored PDCCH for other types of control signalling.
  There are some agreements on beam management and/or group common PDCCH in the RAN1 WG1 #90 meeting, as stated in the Final Chairman's Note of 3GPP TSG RAN WG1 #90 v1.0.0 (Prague, Czech Republic, 21-25 Aug. 2017) as follows:
Working Assumption:
  'Unknown' resource is 'flexible' and can be overridden by at least by DCI indication; 'Unknown' is used to achieve the (FFS: exactly/approximately) the same as 'Reserved' if not overridden.
    'Unknown' is signalled at least by SFI in a group-common PDCCH
    FFS: Possibility of overridden by some types of RRC (e.g., measurement configuration)
  'Reserved' resource is 'not transmit' and 'not receive' but cannot be overridden by DCI/SFI indication.
    'Reserved' is signalled at least by RRC
    FFS: handling of 'gap'
  For semi-static DL/UL transmission direction, 'Unknown' can be informed as part of the semi-static configuration.

One or multiple of following terminologies may be used hereafter:
BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
TRP: A transmission and reception point provides network coverage and directly communicates with UEs. TRP could also be referred to as distributed unit (DU) or network node.
Cell: A cell is composed of one or multiple associated TRPs, i.e. coverage of the cell is composed of coverage of all associated TRP(s). One cell is controlled by one BS. Cell could also be referred to as TRP group (TRPG).
Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.
Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.
Serving beam: A serving beam for a UE is a beam generated by a network node, e.g. TRP, which is currently used to communicate with the UE, e.g. for transmission and/or reception.
Candidate beam: A candidate beam for a UE is a candidate of a serving beam. Serving beam may or may not be candidate beam.
Qualified beam: A qualified beam is a beam with radio quality, based on measuring signal on the beam, better than a threshold.
The best serving beam: The serving beam with the best quality (e.g. the highest BRSRP value).
The worst serving beam: The serving beam with the worst quality (e.g. the worst BRSRP value).
One or multiple of following assumptions for network side may be used hereafter:
NR using beamforming could be standalone, i.e. UE can directly camp on or connect to NR.
  NR using beamforming and NR not using beamforming could coexist, e.g. in different cells.
TRP would apply beamforming to both data and control signaling transmissions and receptions, if possible and beneficial.

Number of beams generated concurrently by TRP depends on TRP capability, e.g. maximum number of beams generated concurrently by different TRPs may be different.

Beam sweeping is necessary, e.g. for the control signaling to be provided in every direction.

(For hybrid beamforming) TRP may not support all beam combinations, e.g. some beams could not be generated concurrently. FIG. 18 shows an example for combination limitation of beam generation.

Downlink timing of TRPs in the same cell are synchronized.

RRC layer of network side is in BS.

TRP should support both UEs with UE beamforming and UEs without UE beamforming, e.g. due to different UE capabilities or UE releases.

One or multiple of following assumptions for UE side may be used hereafter:

UE may perform beamforming for reception and/or transmission, if possible and beneficial.

Number of beams generated concurrently by UE depends on UE capability, e.g. generating more than one beam is possible.

Beam(s) generated by UE is wider than beam(s) generated by TRP, gNB, or eNB.

Beam sweeping for transmission and/or reception is generally not necessary for user data but may be necessary for other signaling, e.g. to perform measurement.

Figure 13:
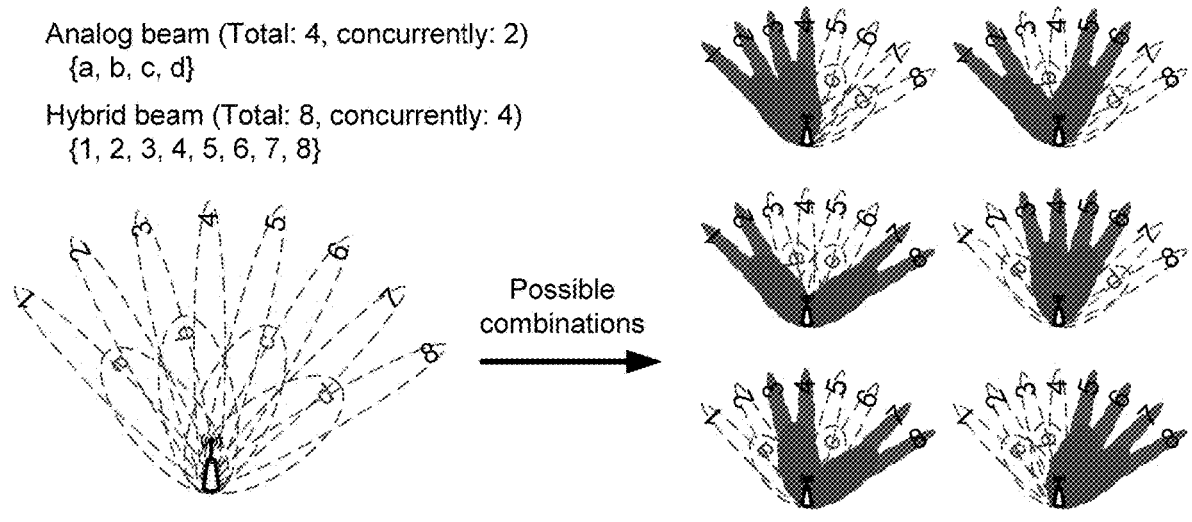
FIG. 13 shows an exemplary combination limitation of beam generation.

(For hybrid beamforming) UE may not support all beam combinations, e.g. some beams could not be generated concurrently. FIG. 13 shows an example of combination limitation of beam generation.

Not every UE supports UE beamforming, e.g. due to UE capability or UE beamforming is not supported in NR first (few) release(s).

One UE is possible to generate multiple UE beams concurrently and to be served by multiple serving beams from one or multiple TRPs of the same cell.

Same or different (DL or UL) data could be transmitted on the same radio resource via different beams for diversity or throughput gain.

There are at least two UE (RRC) states: connected state (or called active state) and non-connected state (or called inactive state or idle state). Inactive state may be an additional state or belong to connected state or non-connected state.

Figure 14:
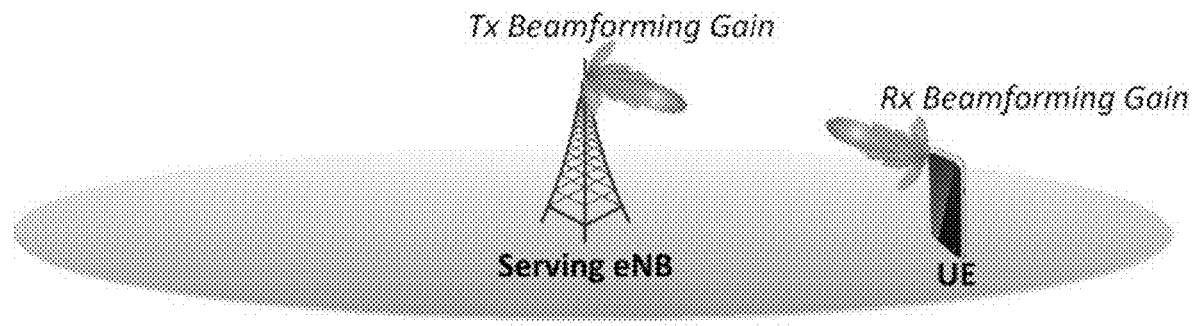
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14 (a reproduction of FIG. 3 of 3GPP R2-162251) illustrates gain compensation by beamforming.

Figure 15:
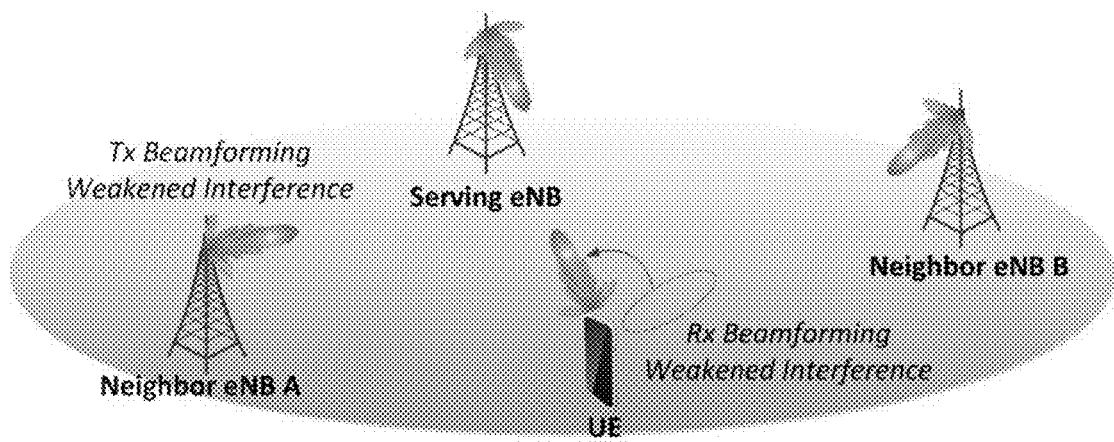
FIG. 15 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15 (a reproduction of FIG. 4 of 3GPP R2-162251) illustrates a weakened interference by beamforming.

As described in 3GPP RP-171880, integrated access and backhaul links are considered for support for wireless backhaul and relay links enabling flexible and very dense deployment of NR cells. Larger bandwidth (e.g. mmWave spectrum) and massive MIMO or multi-beam systems in NR are expected compared to LTE.

Supporting in-band relays, such that backhaul link and access link are on the same frequency, is quite important deployment scenarios. Relay nodes can multiplex access and backhaul links in time, frequency, or space (e.g. beam-based operation).

As the transmitter of a relay node (RN) may cause interference to its own receiver, like a kind of self-interference, simultaneous reception and transmission on the same frequency resource at the relay node may not be feasible unless sufficient isolation of the outgoing and incoming signals is provided. In one possible way, the reception and transmission at the relay node may be performed on different beams or different antenna panels. If a transmission beam and a reception beam are beamformed via at least one same antenna or antenna element, the self-interference may occur for the transmission beam and the reception beam. On the other hand, Time Division Multiplexing (TDM) may be adopted for transmission and reception at a relay node.

Figure 22:
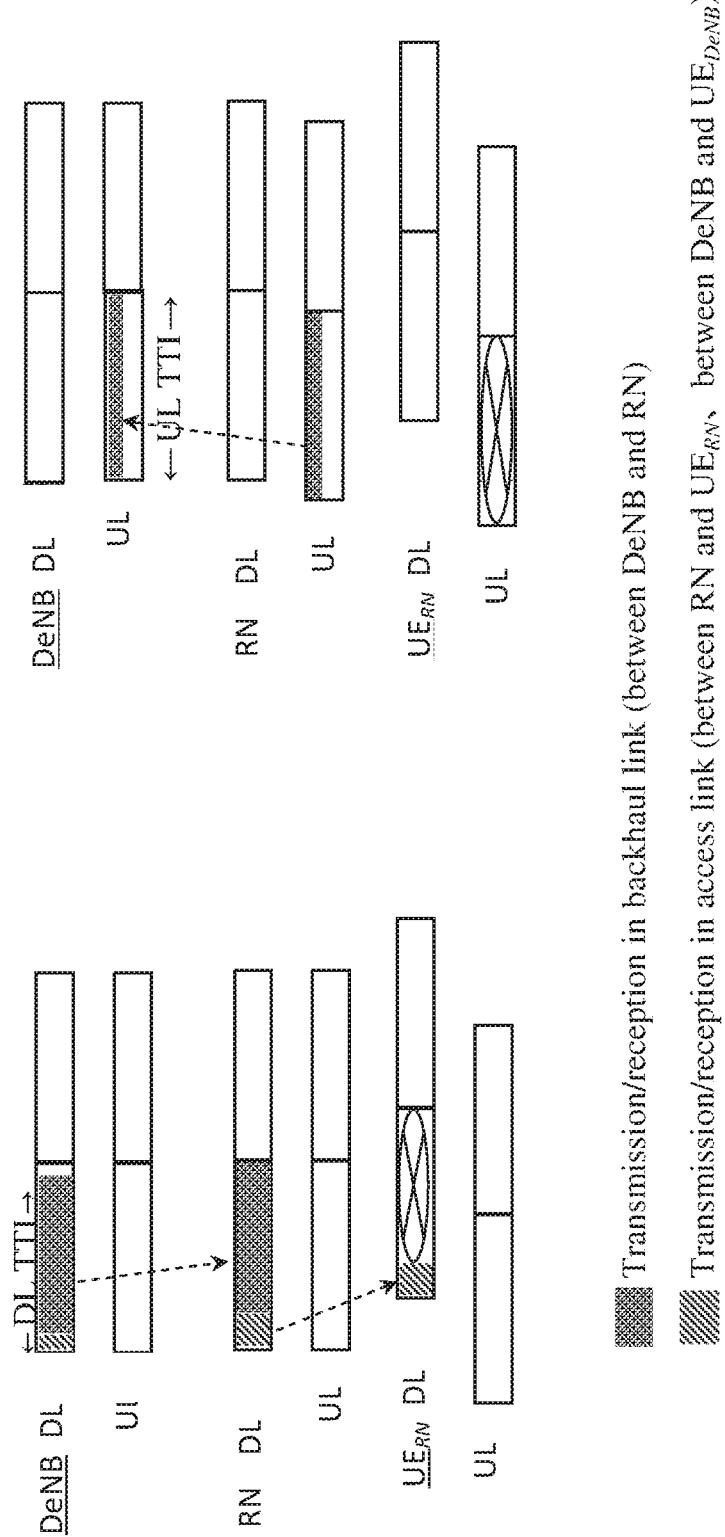
FIG. 22 is a diagram according to one exemplary embodiment.

In LTE/LTE-A (discussed in 3GPP TS 36.216), TDM is the way adopted to avoid self-interference. As shown in FIG. 22, for DeNB-to-RN transmission in downlink subframe, the DeNB (Donor eNB) transmits downlink control signaling and/or downlink data transmission to RN with part of the subframe. The starting symbol of the part of the subframe is one of the 2nd, 3rd, and 4th symbol depending on relay configuration. The ending symbol of the part of the subframe is the penultimate symbol if downlink subframes are transmitted with time aligned subframe boundaries by the donor DeNB and the relay node; otherwise the last symbol. In the downlink subframe, the RN can transmit to UE served by the RN (noted as $UE_{RN}$) before receiving transmission from DeNB. When RN receives transmission from DeNB, the RN cannot simultaneously transmit to UE served by the RN. In other word, the DeNB-to-RN transmission and RN-to-UE transmission are multiplexed in TDM. Moreover, the RN cannot receive transmission from UE since the subframe is downlink subframe.

From the RN-to-DeNB transmission in LTE/LTE-A, the RN transmits control signaling and/or data transmission as following the behavior of UEs served by the DeNB ($UE_{DeNB}$). Thus, RN will adopt TA (timing advance) to perform the RN-to-DeNB transmission to DeNB in uplink subframe as shown in FIG. 22. More specifically, the TA takes into account the Round Trip Delay (RTD) between RN and DeNB in order to compensate the transmission/propagation delay between RN and DeNB. The TA may be set the same as the RTD. When the RN transmits transmission to the DeNB, the RN cannot simultaneously receive from UE served by the RN. In other word, the RN-to-DeNB transmission and UE-to-RN transmission are multiplexed in TDM. Moreover, the RN cannot transmit transmission to UE since the subframe is uplink subframe.

In NR, network could provide slot format related information (SFI) to indicate symbol or slot structure to UE. The slot format related information informs the UEs of the number of slots and the slot format(s) related information of those slots. The symbol or slot may be set to DL, UL, Unknown, or Reserved. "Unknown" resource could be "flexible" and may be overridden by at least by DCI indication. "Reserved" resource could be "not transmit" and "not receive" but cannot be overridden by DCI/SFI indication.

Network can provide slot format related information (SFI) via any of semi-static DL or UL assignment, dynamic SFI, and DCI scheduling UE specific transmission. The semi-static DL or UL assignment may indicate states comprising DL, UL, Unknown, or Reserved. The network provides semi-static DL or UL assignment via Cell-specific RRC configuration (e.g. SIB) and/or additionally UE-specific RRC configuration. The UE-specific RRC configuration may overwrite the "unknown" state of the cell-specific RRC configuration.

Moreover, the dynamic SFI may indicate states comprising DL, UL, or Unknown. The UE may monitor/receive GC-PDCCH carrying dynamic SFI. The "Unknown" in semi-static DL or UL assignment may be overwritten by dynamic SFI. The "DL" or "UL" in semi-static DL or UL assignment cannot be overwritten to "unknown" or the other direction (DL to UL or UL to DL) by dynamic SFI.

Furthermore, DCI scheduling UE specific transmission may indicate states comprising DL, or UL. The UE may monitor or receive downlink control signaling or channel to acquire DCI scheduling UE specific transmission, such as UE specific DCI triggered downlink data transmission, uplink data transmission, reference signal triggering, beam report, CSI report, and A/N for a downlink data transmission. The "UL" or "DL" in dynamic SFI and semi-static DL or UL assignment cannot be overwritten by DCI scheduling UE specific transmission. "Unknown" in dynamic SFI can be overwritten by DCI scheduling UE specific transmission (change to DL or UL). The UE will follow the DCI for UE-specific transmission and reception.

The design in NR allows network to adjust transmission direction. Considering multiple relay nodes (rTRPs) deployment for a cell, if each relay node is able to adjust transmission direction at least for some symbols or TTIs without full cell alignment, it would be more resource-efficient and adaptable based on real traffic with the coverage of each relay node. In other word, even though the full coverage of a same cell comprises the coverage of multiple relay nodes, the transmission direction may be different for separate relay nodes at least for some symbols or TTIs. It is quite different from the LTE/LTE-A. Thus, reusing transmission method in FIG. 22 for backhaul link will limit the transmission direction setting between relay nodes since the TTI for backhaul link between DeNB and relay node in LTE/LTE-A is either set to DL at both DeNB and relay node or set to UL at both DeNB and relay node. In other words, via reusing transmission method in FIG. 22, the DeNB transmits DeNB-to-RN transmission in the TTI with transmission direction set to DL, and the RN receives the DeNB-to-RN transmission in the TTI with transmission direction set to DL. Although the RN performs reception for the DeNB-to-RN transmission, the UEs served by the RN still considers the TTI as DL (MBSFN subframe is DL subframe). Via reusing transmission method in FIG. 22, the RN transmits RN-to-DeNB transmission in the TTI with transmission direction set to UL, and the DeNB receives the RN-to-DeNB transmission in the TTI with transmission direction set to UL. Although the RN performs transmission for the RN-to-DeNB transmission, the UEs served by the RN still considers the TTI as UL.

Moreover, reusing the transmission method in FIG. 22 for backhaul link will forbid transmission in access link when there is transmission in backhaul link. More specifically, it may mean that the RN receives DeNB-to-RN transmission in the TTI with transmission direction set to DL, the RN cannot simultaneously perform transmission or reception in access link for UEs. It may mean that the RN transmits RN-to-DeNB transmission in the TTI with transmission direction set to UL, the RN cannot simultaneously perform transmission or reception in access link for UEs. Although the transmission in access link and in backhaul link may be multiplexed in different beams in NR, the self-interference may still restrict the same transmission direction for some beams. It means that the relay node cannot simultaneously transmit in part of the some beams and receive in other part of the some beams. Thus, considering reusing the transmission method in FIG. 22 for NR backhaul link, it will forbid transmission in access link in other part of the some beams when there is transmission in part of the some beams in backhaul link.

To acquire resource-efficiency and adaptability based on real traffic with coverage of each relay node, some alternatives may be applied. One alternative is to support node-to-node transmission in backhaul link without restriction on each node's transmission direction setting. A transmission in backhaul link from a first network node to a second network node could be performed regardless of the transmission direction settings of the first network node and the second network node. For example, a transmission in backhaul link from a first network node to a second network node could be performed when the transmission direction setting of the first network node is different from the transmission direction setting of the second network node.

A first network node could transmit a first transmission to a second network node in a transmission occasion, wherein the transmission occasion comprises at least a first TTI or first symbol with transmission direction set to a first direction in the first network node and the transmission occasion comprises a second TTI or second symbol with transmission direction set to a second direction in the second network node. More specifically, the second direction is opposite to the first direction. The first TTI is (at least partially) overlapped with the second TTI in time domain. The first symbol is (at least partially) overlapped with the second symbol in time domain.

Figure 23:
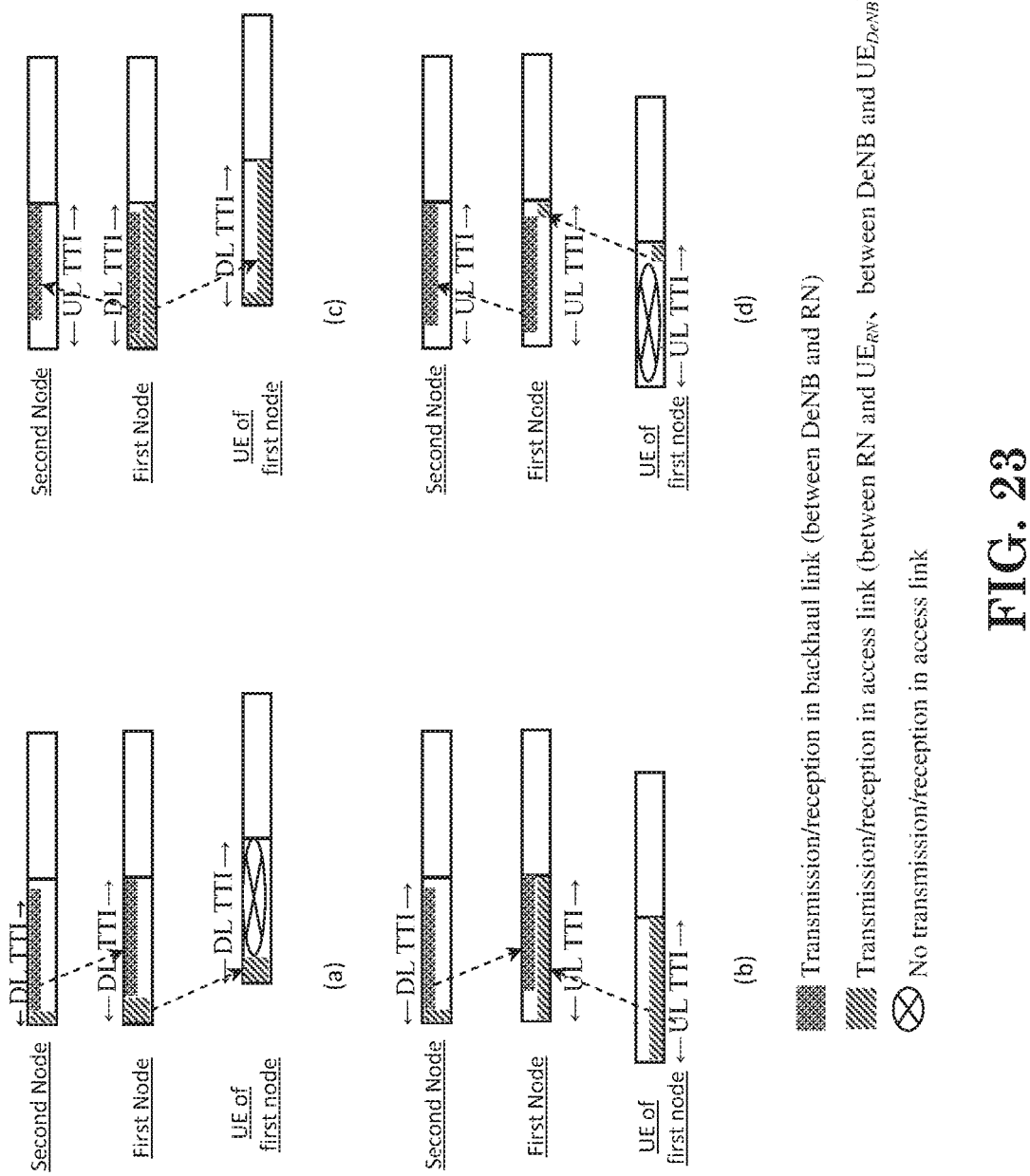
FIG. 23 is a diagram according to one exemplary embodiment.

In one embodiment, the first direction is downlink and the second direction is uplink. Furthermore, the first network node may transmit a second transmission to a UE served by the first network node in the transmission occasion. FIG. 23(c) shows an instance. In one embodiment, TTI boundary of the first TTI with transmission direction set to downlink in the first network node is aligned to TTI boundary of the second TTI with transmission direction set to uplink in the second network node. The first network node transmits the first transmission to the second network node and transmits the second transmission to the UE served by the first network node on the same beam. The first network node transmits the first transmission to the second network node on one beam and transmits the second transmission to the UE served by the first network node on another beam(s). Alternatively, the first network node transmits the first transmission to the second network node in the first TTI with transmission direction set to downlink in the first network node, where the first TTI with transmission direction set to downlink in the first network node for the first transmission to the second network node is TTI-level aligned to a third TTI with transmission direction set to uplink in the first network node for a third transmission to the second network node.

In one embodiment, TTI-level alignment between the first TTI and the third TTI means that the TTI (starting) boundary time distance of the first TTI and the third TTI is integer times of TTI length. There may be a gap or time-interval between the starting timing of the first transmission to the second network node in the TTI with transmission direction set to downlink in the first network node and a starting boundary of the TTI. The gap or time-interval may be configured or indicated by signaling. Alternatively, the starting timing of the first transmission to the second network node in the first TTI with transmission direction set to downlink in the first network node is with same gap or time-interval to TTI (starting) boundary as starting timing of a third transmission to the second network node in a third TTI with transmission direction set to uplink in the first network node.

In one embodiment, the first direction is uplink and the second direction is downlink. The TTI boundary of the first TTI with transmission direction set to uplink in the first network node is aligned to TTI boundary of the second TTI with transmission direction set to downlink in the second network node. In one embodiment, the first network node transmits the first transmission to the second network node in the first TTI with transmission direction set to uplink in the first network node, where the first TTI with transmission direction set to uplink in the first network node for the first transmission to the second network node is TTI-level aligned to a third TTI with transmission direction set to downlink in the first network node for a third transmission to the second network node. In one embodiment, the TTI-level alignment between the first TTI and the third TTI means that the TTI (starting) boundary time distance of the first TTI and the third TTI is integer times of TTI length.

In one embodiment, there may be a gap or time-interval between the starting timing of the first transmission to the second network node in the TTI with transmission direction set to uplink in the first network node and a starting boundary of the TTI. The gap or time-interval may be configured or indicated by signaling. Alternatively, the starting timing of the first transmission to the second network node in the first TTI with transmission direction set to uplink in the first network node is with same gap or time-interval to TTI (starting) boundary as starting timing of a third transmission to the second network node in a third TTI with transmission direction set to downlink in the first network node.

The first network node could receive a first transmission from a second network node in a transmission occasion, wherein the transmission occasion comprises at least a first TTI or first symbol with transmission direction set to a first direction in the first network node and the transmission occasion comprises a first TTI or second symbol with transmission direction set to a second direction in the second network node. More specifically, the second direction is opposite to the first direction. More specifically, the first TTI is (at least partially) overlapped with the second TTI in time domain. The first symbol is (at least partially) overlapped with the second symbol in time domain.

In one embodiment, the first direction is uplink and the second direction is downlink. Furthermore, the first network node may receive a second transmission from a UE served by the first network node in the transmission occasion. FIG. 23(b) shows an instance. In one embodiment, TTI boundary of the first TTI with transmission direction set to uplink in the first network node is aligned to TTI boundary of the second TTI with transmission direction set to downlink in the second network node. The first network node receives the first transmission from the second network node and receives the second transmission from the UE served by the first network node on the same beam. Alternatively, the first network node receives the first transmission from the second network node on one beam and receives the second transmission from the UE served by the first network node on another beam.

In one embodiment, the first network node receives the first transmission from the second network node in the first TTI with transmission direction set to uplink in the first network node, where the first TTI with transmission direction set to uplink in the first network node for receiving the first transmission from the second network node is TTI-level aligned to a third TTI with transmission direction set to downlink in the first network node for receiving a third transmission from the second network node. The TTI-level alignment between the first TTI and the third TTI means that the TTI (starting) boundary time distance of the first TTI and the third TTI is integer times of TTI length.

In one embodiment, there may be a gap or time-interval between the starting reception timing of the first transmission from the second network node in the TTI with transmission direction set to uplink in the first network node and a starting boundary of the TTI. The gap or time-interval may be configured or indicated by signaling. Alternatively, the starting reception timing of the first transmission from the second network node in the first TTI with transmission direction set to uplink in the first network node is with same gap or time-interval to TTI (starting) boundary as starting reception timing of a third transmission from the second network node in a third TTI with transmission direction set to downlink in the first network node.

In one embodiment, the first direction is downlink and the second direction is uplink. The TTI boundary of the first TTI with transmission direction set to downlink in the first network node is aligned to TTI boundary of the second TTI with transmission direction set to uplink in the second network node. In one embodiment, the first network node receives the first transmission from the second network node in the first TTI with transmission direction set to downlink in the first network node, where the first TTI with transmission direction set to downlink in the first network node for receiving the first transmission from the second network node is TTI-level aligned to a third TTI with transmission direction set to uplink in the first network node for receiving a third transmission from the second network node. The TTI-level alignment between the first TTI and the third TTI means that the TTI (starting) boundary time distance of the first TTI and the third TTI is integer times of TTI length.

In one embodiment, there may be a gap or time-interval between the starting reception timing of the first transmission from the second network node in the first TTI with transmission direction set to downlink in the first network node and a starting boundary of the TTI. Alternatively, the starting reception timing of the first transmission from the second network node in the first TTI with transmission direction set to downlink in the first network node is with same gap or time-interval to TTI (starting) boundary as starting reception timing of a third transmission from the second network node in a third TTI with transmission direction set to uplink in the first network node.

The backhaul link may be a link with no endpoint is a UE, a link between a relay node and an anchor node, or a link between a relay node and another relay node. The access link may be a link with one endpoint is a UE, a link between a UE and a relay node, or a link between a UE and an anchor node.

In one embodiment, the first network node could be a relay node, a relay TRP, an anchor node, a donor gNB, or a base station. The second network node could be a relay node, a relay TRP, an anchor node, a donor gNB, or a base station.

Another alternative is to support that a relay node performs transmission in backhaul link and performs transmission in access link at the same time. More specifically, the relay node may perform reception in backhaul link and performs reception in access link at the same time.

In one embodiment, a first network node is served by a second network node, and the first network node serves a UE. The first network node may configure/schedule the UE to perform reception in at least one symbol. The first network node may transmit a second transmission to the UE in the at least one symbol. Moreover, the first network node may transmit a first transmission to the second network node in the at least one symbol. The at least one symbol could be with transmission direction set to downlink in the first network node.

In one embodiment, the first network node transmits the second transmission to the UE in a TTI with transmission direction set to downlink in the first network node. The first network node could transmit the first transmission to the second network node, and could transmit the second transmission to the UE on the same beam. Alternatively, the first network node could transmit the first transmission to the second network node on one beam, and could transmit the second transmission to the UE on another beam(s). Furthermore, the first network node could schedule the UE to perform reception via a control signaling.

In one embodiment, a first network node could be served by a second network node, and the first network node serves a UE. The first network node may configure or schedule the UE to perform transmission in at least one symbol. The first network node may receive a second transmission from the UE in the at least one symbol. Moreover, the first network node may receive a first transmission from the second network node in the at least one symbol. In one embodiment, the at least one symbol could be with transmission direction set to uplink in the first network node.

In one embodiment, the first network node could receive the second transmission from the UE in a TTI with transmission direction set to uplink in the first network node. Furthermore, the first network node could receive the first transmission from the second network node and receives the second transmission from the UE on the same beam. Also, the first network node could receive the first transmission from the second network node on one beam and receives the second transmission from the UE on another beam(s). In addition, the first network node could schedule the UE to perform transmission via a control signaling.

In one embodiment, the first network node could be a relay node or a relay TRP. The second network node could be an anchor node, a donor gNB, a relay node or TRP, or a base station. The second network node could be a relay node or TRP with hop level higher than the first network node.

In one embodiment, the first network node may not be a UE, and the second network node may not be a UE.

In one embodiment, the first transmission between the first network node and the second network node could be a node-to-node transmission. The first transmission between the first network node and the second network node could be transmitted in backhaul link. The transmission direction setting in the first network node may not be the transmission direction in backhaul link or the transmission direction between the first network node and the second network node.

In one embodiment, the second transmission between the first network node and the UE served by the first network node could be transmitted in access link. The transmission direction setting in the first network node could mean the transmission direction in access link or the transmission direction between the first network node and the UE served by the first network node.

In one embodiment, the UE served by the first network node could monitor or receive the second transmission from the first network node in a TTI or symbol with transmission direction set to downlink in the first network node. Furthermore, the UE served by the first network node could transmit the second transmission to the first network node in a TTI or symbol with transmission direction set to uplink in the first network node. The first network node could transmit the second transmission to the UE(s) served by the first network node in a TTI or symbol with transmission direction set to downlink in the first network node. The first network node could receive the second transmission from the UE served by the first network node in a TTI or symbol with transmission direction set to uplink in the first network node.

In one embodiment, a TTI could mean a slot, a mini-slot, a sub-slot, a subframe, or one time unit of transmission. Alternatively, a TTI could comprise at least one symbol.

In one embodiment, the TTI boundary of the first TTI with transmission direction set to uplink in the first network node could be aligned to the TTI boundary of the second TTI with transmission direction set to uplink or downlink in the second network node.

In one embodiment, the hop level could mean the hop times between a relay node or a relay TRP and an anchor node or a donor gNB in backhaul link. A relay node or a relay TRP with higher hop level could mean the smaller or nearer hop times to anchor node or a donor gNB. A relay node or a relay TRP with lower hop level could mean the larger or further hop times to anchor node or a donor gNB.

In one embodiment, the backhaul link may be a link with no endpoint is a UE, a link between a relay node and an anchor node, a link between a relay node and another relay node, a link with one endpoint is a UE, a link between a UE and a relay node, or a link between a UE and an anchor node.

In LTE/LTE-A (discussed in U.S. Provisional Patent Application Ser. No. 62/609,216 filed on Dec. 21, 2017), TDM is applied for resource multiplexing between access link and backhaul link via semi-static scheduling. Moreover, downlink subframes configured for DeNB-to-RN transmission shall be configured as MBSFN subframes by the relay node. For FDD cell, a subframe n is configured for RN-to-DeNB transmission if subframe n−4 is configured for DeNB-to-RN transmission. For TDD cell, the downlink subframes for DeNB-to-RN and the uplink subframes configured for RN-to-DeNB transmissions are configured by higher layers.

To acquire resource-efficiency and adaptability based on real traffic with coverage of each relay node, one possible way is to support a relay node performs transmission in backhaul link and performs transmission in access link at the same time. More specifically, the relay node may perform reception in backhaul link and performs reception in access link at the same time. In this way, the setting of slot format related information (SFI) for UEs may be related to the transmission or reception for node-to-node transmission. The relay node may require information of the transmission and reception timing in backhaul link to schedule/configure the SFI for UEs.

For a first network node served by a second network node, the first network node may receive a first information of symbol and/or slot structure from a second network node. For a UE served by the first network node, the first network node may transmit a second information of symbol and/or slot structure to the UE, wherein the second information is derived based on the first information. More specifically, if the first information is updated or changed, the first network node may update/change the second information based on the updated or changed first information. The first information could indicate or configure the transmission occasions between the first network node and the second network node. The first information could be for backhaul link, and the second information could be for access link. Alternatively, the first information could be for access link in the second network node, and the second information could be for access link in the first network node.

In one embodiment, the first information indicating symbol and/or slot structure could comprise at least Downlink and/or Uplink. Alternatively, the first information indicating symbol and/or slot structure could comprise at least Downlink, Uplink, Unknown, and/or Reserved. In on embodiment, the first information indicating symbol and/or slot structure could comprise at least Transmit and/or Receive. Alternatively, the first information indicating symbol and/or slot structure could comprise at least Transmit and/or Receive, and/or "not transmit and not receive". The first information indicating symbol and/or slot structure could also comprise at least Transmit and/or Receive, Unknown, and/or Reserved.

In one embodiment, the second information indicating symbol and/or slot structure could comprise at least Downlink and/or Uplink. Alternatively, the second information indicating symbol and/or slot structure could comprise at least Downlink, Uplink, Unknown, and/or Reserved.

In one embodiment, the Downlink indicated in the first information at least for a symbol or slot could mean that the second network node transmits transmission in access link at least in the symbol/slot. The Downlink indicated in the second information at least for a symbol or slot could mean that the first network node transmits transmission to the UE at least in the symbol or slot. In one embodiment, the Uplink indicated in the first information at least for a symbol or slot could mean that the second network node receives transmission in access link at least in the symbol/slot. The Uplink indicated in the second information at least for a symbol or slot could mean that the first network node receives transmission from the UE at least in the symbol or slot.

In one embodiment, the Unknown indicated in the first information at least for a symbol or slot could be overridden to Downlink or Uplink at least by downlink control information indication for access link in the second network node. The Unknown indicated in the second information at least for a symbol or slot could be overridden to Downlink or Uplink at least by downlink control information indication for the UE.

In one embodiment, the Reserved indicated in the first information at least for a symbol or slot may mean "Not Downlink" and "Not Uplink", and may not be overridden by downlink control information indication for access link in the second network node. The Reserved indicated in the second information at least for a symbol or slot may mean "Not Downlink" and "Not Uplink", and may not be overridden by downlink control information indication for the UE.

Alternatively, the Reserved indicated in the first information at least for a symbol or slot may mean "Not transmit" and "Not receive", and may not be overridden by downlink control information indication for access link in the second network node. The Reserved indicated in the second information at least for a symbol or slot may mean "Not transmit" and "Not receive", and may not be overridden by downlink control information indication for the UE.

In one embodiment, the Transmit indicated in the first information at least for a symbol or slot could mean that any of (i) the second network node transmits node-to-node transmission in backhaul link at least in the symbol or slot, (ii) the second network node transmits node-to-node transmission to the first network node at least in the symbol or slot, and/or (iii) the first network node monitors/receives node-to-node transmission from the second network node at least in the symbol or slot. The Receive indicated in the first information at least for a symbol or slot could mean that any of (i) the second network node monitors or receives node-to-node transmission in backhaul link at least in the symbol or slot, (ii) the second network node monitors or receives node-to-node transmission from the first network node at least in the symbol or slot, and/or (iii) the first network node transmits node-to-node transmission to the second network node at least in the symbol or slot.

In one embodiment, the "not transmit and not receive" indicated in the first information at least for a symbol or slot could mean "Not transmit" and "Not receive". Furthermore, the "not transmit and not receive" indicated in the first information at least for a symbol or slot may not be overridden by downlink control information indication for the first network node. Alternatively, the "not transmit and not receive" indicated in the first information at least for a symbol or slot may be able to be overridden by downlink control information indication for the first network node.

In one embodiment, the Unknown indicated in the first information at least for a symbol or slot may be overridden to Transmit or Receive at least by downlink control information indication for the first network node. The Reserved indicated in the first information at least for a symbol or slot could mean "Not transmit" and "Not receive", and may not being able to be overridden by downlink control information indication for the first network node.

In one embodiment, the first information could be configured by cell-specific configuration or system information in the second network node, and the second information could be configured by cell-specific configuration or system information in the first network node. The second information derived based on the first information could comprise that at least for a symbol or slot, the first information indicates Downlink, and the second information indicates Downlink. Alternatively, the second information derived based on the first information could comprise that at least for a symbol or slot, the first information indicates Uplink, and the second information indicates Uplink. In addition, the second information derived based on the first information could comprise that at least for a symbol or slot, the first information indicates Reserved, and the second information indicates Reserved. The second information derived based on the first information comprises that the second information is the same with the first information.

In another embodiment, the first information could be configured by first network node-specific configuration from the second network node, and the second information could be configured by UE-specific configuration from the first network node. Alternatively, the first information could be configured by first network node-specific configuration from the second network node, and the second information could be carried via UE group common downlink control information from the first network node. Alternatively, the first information could be configured by first network node-specific configuration from the second network node, and the second information could be carried via downlink control information scheduling UE-specific transmission from the first network node. Alternatively, the first information could be carried via node group common downlink control information from the second network node, and the second information could be carried via UE group common downlink control information from the first network node. Alternatively, the first information could be carried via node group common downlink control information from the second network node, and the second information could be carried via downlink control information scheduling UE-specific transmission from the first network node.

In one embodiment, the second information derived based on the first information comprises that at least for a symbol or a slot which the first information indicates Downlink or Transmit, the second information could indicate the symbol or the slot as Uplink. The second information derived based on the first information comprises that at least for a symbol or slot which the first information indicates Transmit, the second information could indicate the symbol or the slot as Unknown. Alternatively, the second information derived based on the first information comprises that at least for a symbol or slot which the first information indicates Transmit, the second information could indicate the symbol or the slot as Reserved. Alternatively, the second information derived based on the first information comprises that at least for a symbol or slot which the first information indicates Uplink or Receive, the second information could indicate the symbol or the slot as Downlink. Alternatively, the second information derived based on the first information comprises that at least for a symbol or slot which the first information indicates Receive, the second information could indicate the symbol or the slot as Unknown. Preferably, the second information derived based on the first information comprises that at least for a symbol or slot which the first information indicates Receive, the second information could indicate the symbol or the slot as Reserved.

In one embodiment, the second information derived based on the first information comprises that at least for a symbol or slot which the first information indicates Unknown, the second information could indicate the symbol or the slot as Downlink. Alternatively, the second information derived based on the first information comprises that at least for a symbol or slot which the first information indicates Unknown, the second information could indicate the symbol or the slot as Uplink. Alternatively, the second information derived based on the first information comprises that at least for a symbol or slot which the first information indicates "not transmit and not receive", the second information could indicate the symbol or the slot as Downlink. Alternatively, the second information derived based on the first information comprises that at least for a symbol or slot which the first information indicates "not transmit and not receive", the second information could indicate the symbol or the slot as Uplink. Alternatively, the second information derived based on the first information comprises that at least for a symbol or slot which the first information indicates Reserved, the second information could indicate the symbol or the slot as Reserved. Alternatively, the second information derived based on the first information comprises that at least for a symbol or slot which the first information indicates Reserved, the second information could indicate the symbol or the slot as Downlink. Alternatively, the second information derived based on the first information comprises that at least for a symbol or slot which the first information indicates Reserved, the second information could indicate the symbol or the slot as Uplink.

In one embodiment, the second information derived based on the first information comprises that at least for a symbol or slot which the first information indicates Downlink or Transmit, the second information may not indicate the symbol or the slot as Downlink. In one embodiment, the second information derived based on the first information could comprise that at least for a symbol or slot which the first information indicates Uplink or Receive, the second information may not indicate the symbol or the slot as Uplink. Alternatively, the second information derived based on the first information could comprise that at least for a symbol or slot which the first information indicates Downlink or Transmit, the second information could indicate the symbol or the slot as Downlink. Alternatively, the second information derived based on the first information could comprise that at least for a symbol or slot which the first information indicates Uplink or Receive, the second information could indicate the symbol or the slot as Uplink.

In one embodiment, the UE could monitor or receive the UE group common downlink control information based on configuration for the UE group common downlink control information. More specifically, the UE could monitor or receive the UE group common downlink control information in some TTIs wherein the some TTIs are indicated as Downlink in cell-specific configuration or UE-specific the configuration. Alternatively, the UE could monitor receive the UE group common downlink control information in some TTIs wherein the some TTIs are indicated as Downlink in the second information.

In one embodiment, the first network node could monitor or receive the node group common downlink control information based on configuration for the node group common downlink control information. More specifically, the first network node could monitor or receive the node group common downlink control information in some TTIs wherein the some TTIs are indicated as Downlink or Transmit in the cell-specific configuration or first network node-specific configuration. Alternatively, the first network node could monitor or receive the node group common downlink control information in some TTIs wherein the some TTIs are indicated as Downlink or Transmit in the first information. Alternatively, the first network node could monitor or receive a search space or a CORESET (Control Resource Set) for the node group common downlink control information.

In one embodiment, the UE could monitor or receive the downlink control information scheduling UE-specific transmission based on the indication comprising cell-specific configuration, UE-specific configuration, and/or UE group common downlink control information. Alternatively, the UE could monitor or receive the downlink control information scheduling UE-specific transmission in some TTIs wherein the some TTIs are indicated as Downlink based on the indication comprising cell-specific configuration, UE-specific configuration, and/or UE group common downlink control information. Alternatively, the UE could monitor or receive the downlink control information scheduling UE-specific transmission in some TTIs wherein the some TTIs are indicated as Downlink based on the indication of the second information.

In one embodiment, the first network node could monitor or receive the downlink control information scheduling the first network node-specific transmission based on the indication comprising cell-specific configuration, first network node-specific configuration, and/or node group common downlink control information. Alternatively, the could monitor or receive the downlink control information scheduling the first network node-specific transmission in some TTIs wherein the some TTIs are indicated as Downlink or Transmit based on the indication comprising cell-specific configuration, first network node-specific configuration, and/or node group common downlink control information. Alternatively, the first network node could monitor or receive the downlink control information scheduling the first network node-specific transmission in some TTIs wherein the TTIs could be indicated as Downlink or Transmit based on the first information. Alternatively, the first network node could monitor or receive a search space or a CORESET for the downlink control information scheduling the first network node-specific transmission.

In one embodiment, the first network node could be a relay node or a relay TRP. The second network node could be an anchor node or donor gNB or a base station. More specifically, the second network node could be a relay node or TRP with hop level higher than the first network node. The hop level could mean the hop times between a relay node or a relay TRP and an anchor node or a donor gNB in backhaul link. A relay node or a relay TRP with higher hop level could mean the smaller (or nearer) hop times to anchor node or a donor gNB. Alternatively, a relay node or a relay TRP with lower hop level could mean the larger (or further) hop times to anchor node or a donor gNB.

In one embodiment, the first information could be the same for all nodes belonging to a same cell if the first information is configured by cell-specific configuration. The second information may not be the same for all nodes belonging to a same cell. The second information could inform the UE of the number of slots and the slot format(s) related information of those slots. Alternatively, the second information could inform the UE of the number of symbols and the symbol format(s) related information of those symbols. The second information could also inform the UE of the number of slots and transmission direction related information of those slots. Furthermore, the second information could inform the UE of the number of symbols and transmission direction related information of those symbols.

In one embodiment, the first information could inform the first network node of the number of slots and the slot format(s) related information of those slots. Alternatively, the first information could inform the first network node of the number of symbols and the symbol format(s) related information of those symbols. Furthermore, the first information could inform the first network node of the number of slots and transmission direction related information of those slots. In addition, the first information could inform the first network node of the number of symbols and transmission direction related information of those symbols.

In one embodiment, the UE group common downlink control information could mean that the downlink control information is transmitted for a group of UEs. More specifically, the UE group common downlink control information could mean that the downlink control information is transmitted for more than one UE. The downlink control information scheduling UE-specific transmission could be transmitted for one UE.

In one embodiment, the node group common downlink control information could mean that the downlink control information is transmitted for a group of nodes. More specifically, the node group common downlink control information could mean that the downlink control information is transmitted for more than one node. The downlink control information scheduling first network node-specific transmission could be transmitted for the first network node.

In one embodiment, the UE-specific transmission could mean the transmission between the first network node and the UE. The first network node-specific transmission could mean the transmission between the first network node and the second network node.

In one embodiment, the transmission between the first network node and the second network node could be node-to-node transmission. Alternatively, the transmission between the first network node and the second network node could be transmitted in backhaul link. Alternatively, the transmission between the first network node and the UE could be transmitted in access link. In one embodiment, the backhaul link may be a link with no endpoint is a UE. More specifically, the backhaul link may be a link between a relay node and an anchor node, or a link between a relay node and another relay node. Alternatively, the access link may be a link with one endpoint is a UE. More specifically, the access link may be a link between a UE and a relay node, or a link between a UE and an anchor node.

In one embodiment, a TTI could mean a slot, a mini-slot, a sub-slot, a subframe, or a one-time unit of transmission. The TTI could comprise multiple symbols.

In one embodiment, the first network node served by the second network node could mean that the first network node transmits or receives transmission to or from the second network node based on scheduling or configuration indicated by the second network node. The UE served by the first network node could mean that the UE transmits or receives the second transmission to or from the first network node based on scheduling or configuration indicated by the first network node.

Figure 24:
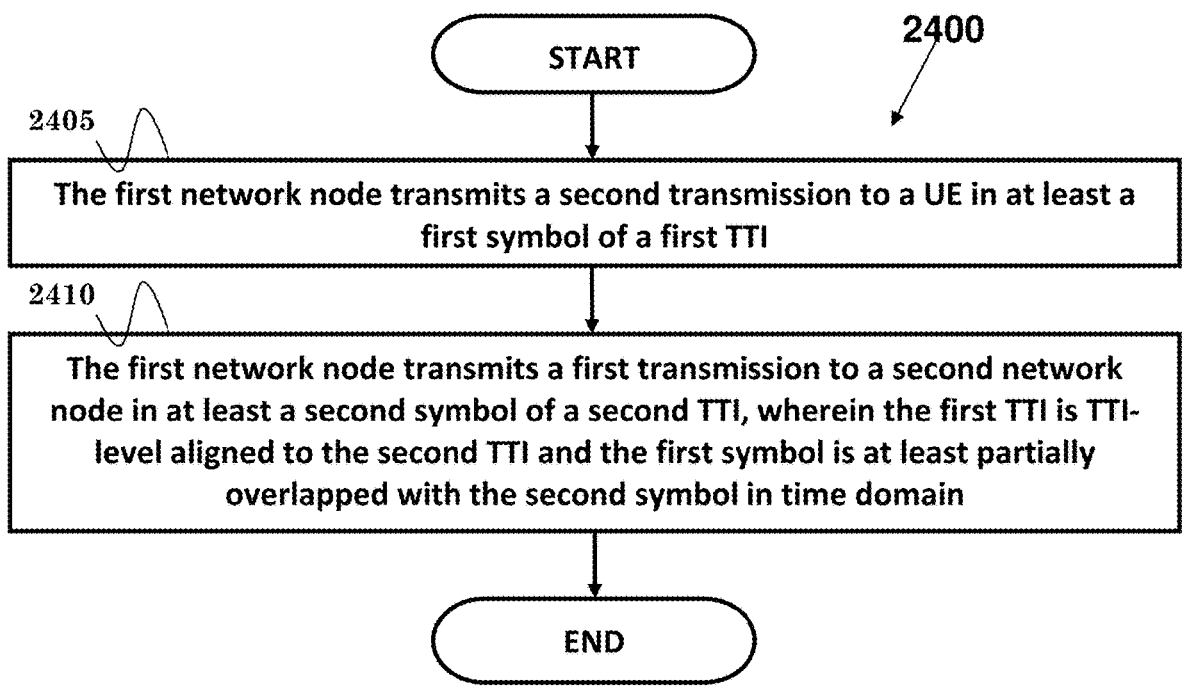
FIG. 24 is a flow chart according to one exemplary embodiment.

FIG. 24 is a flow chart 2400 according to one exemplary embodiment from the perspective of a first network node. In step 2405, the first network node transmits a second transmission to a UE in at least a first symbol of a first TTI. In step 2410, the first network node transmits a first transmission to a second network node in at least a second symbol of a second TTI, wherein the first TTI is TTI-level aligned to the second TTI and the first symbol is at least partially overlapped with the second symbol in time domain.

In one embodiment, the first TTI could be set to a first direction in the first network node, and the second TTI is set to a second direction in the second network node. The second direction could be opposite to the first direction. The first symbol could be set to downlink in the first network node, and the second symbol is set to uplink in the second network node.

In one embodiment, the first network node could transmit the first transmission to the second network node and transmits the second transmission to the UE on the same beam. A starting boundary of the first TTI could be aligned to a starting boundary of the second TTI. A starting timing of the first transmission to the second network node could be with a gap or time-interval to a TTI starting boundary.

In one embodiment, the TTI could mean a slot. The first network node could be a relay node, and the second network node could be a donor node or parent node of the first network node. The UE could be served by the first network node.

Referring back to FIGS. 3 and 4, in one exemplary embodiment of a first network node, the device 300 includes a program code 312 stored in the memory 310. The CPU 308 could execute program code 312 to enable the first network node (i) to transmit a second transmission to a UE in at least a first symbol of a first TTI, and (ii) to transmit a first transmission to a second network node in at least a second symbol of a second TTI, wherein the first TTI is TTI-level aligned to the second TTI and the first symbol is at least partially overlapped with the second symbol in time domain.

Furthermore, the CPU 308 can execute the program code 312 to perform all of the above-described actions and steps or others described herein.

Figure 25:
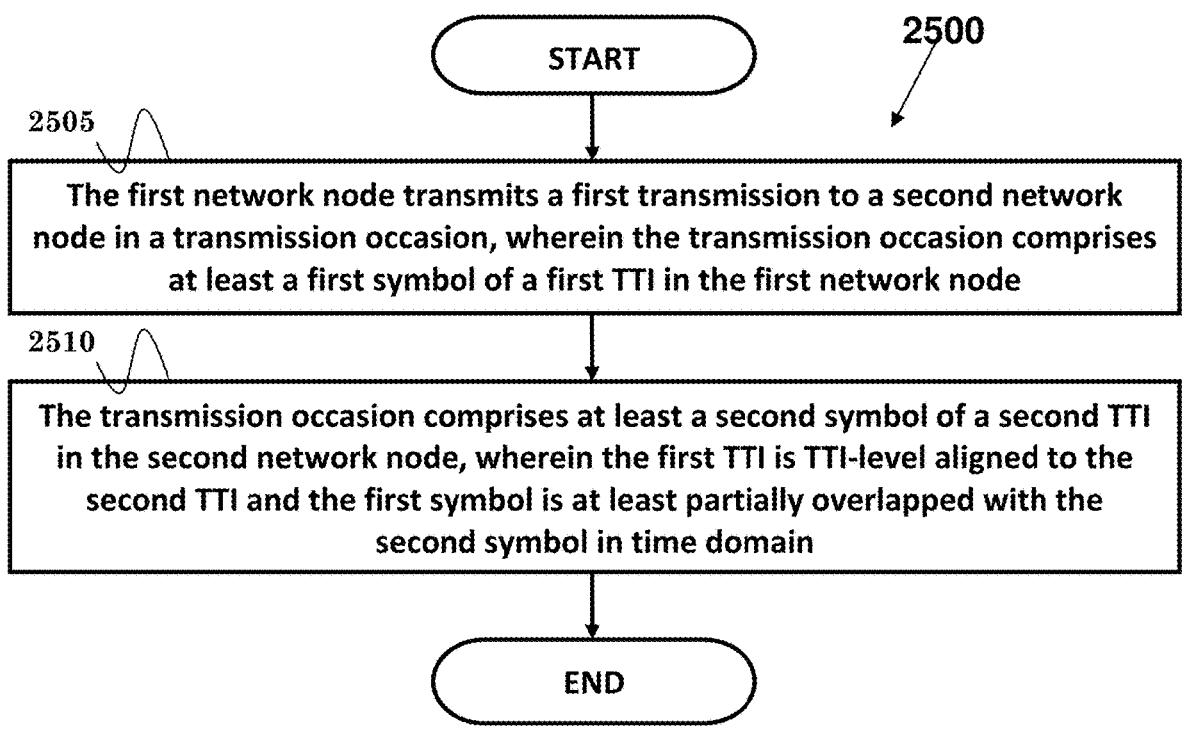
FIG. 25 is a flow chart according to one exemplary embodiment.

FIG. 25 is a flow chart 2500 according to one exemplary embodiment from the perspective of a first network node. In step 2505, the first network node transmits a first transmission to a second network node in a transmission occasion, wherein the transmission occasion comprises at least a first symbol of a first TTI in the first network node. In step 2510, the transmission occasion comprises at least a second symbol of a second TTI in the second network node, wherein the first TTI is TTI-level aligned to the second TTI and the first symbol is at least partially overlapped with the second symbol in time domain.

In one embodiment, the first TTI could be set to a first direction in the first network node, and the second TTI could be set to a second direction in the second network node. The second direction could be opposite to the first direction. The first symbol could be set to downlink in the first network node, and the second symbol could be set to uplink in the second network node.

In one embodiment, the first network node could transmit a second transmission to a UE served by the first network node in the transmission occasion. The first network node could transmit the first transmission to the second network node and transmits the second transmission to a UE served by the first network node on the same beam. A starting boundary of the first TTI could be aligned to a starting boundary of the second TTI. There may be a gap or time-interval between a starting timing of the first transmission to the second network node and the starting boundary of a TTI.

In one embodiment, the TTI could mean a slot. The first network node could be a relay node, and the second network node could be a donor node or parent node of the first network node.

Referring back to FIGS. 3 and 4, in one exemplary embodiment of a first network node, the device 300 includes a program code 312 stored in the memory 310. The CPU 308 could execute program code 312 to enable the first network node (i) to transmit a first transmission to a second network node in a transmission occasion, wherein the transmission occasion comprises at least a first symbol of a first TTI in the first network node, and (ii) the transmission occasion comprises at least a second symbol of a second TTI in the second network node, wherein the first TTI is TTI-level aligned to the second TTI and the first symbol is at least partially overlapped with the second symbol in time domain. Furthermore, the CPU 308 can execute the program code 312 to perform all of the above-described actions and steps or others described herein.

Figure 26:
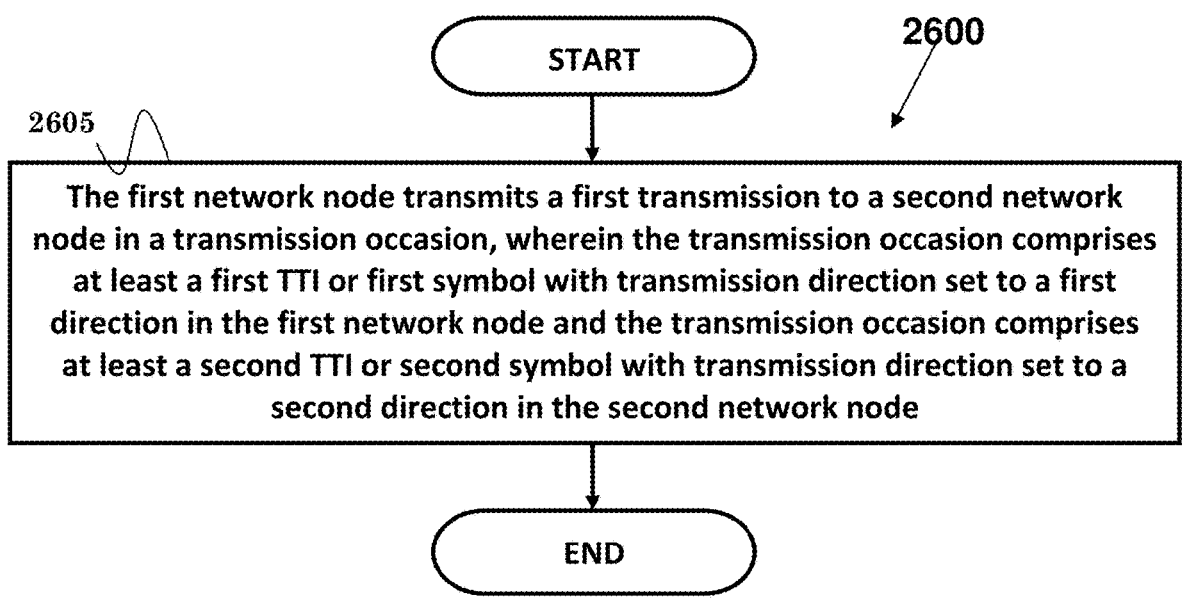
FIG. 26 is a flow chart according to one exemplary embodiment.

FIG. 26 is a flow chart 2600 according to one exemplary embodiment from the perspective of a first network node. In step 2605, the first network node transmits a first transmission to a second network node in a transmission occasion, wherein the transmission occasion comprises at least a first TTI or first symbol with transmission direction set to a first direction in the first network node and the transmission occasion comprises at least a second TTI or second symbol with transmission direction set to a second direction in the second network node.

In one embodiment, the second direction could be opposite to the first direction. The first TTI or first symbol could be (at least partially) overlapped with the second TTI or second symbol in time domain.

In one embodiment, the first network node could transmit a second transmission to a UE served by the first network node in the transmission occasion. Alternatively, the first network node could transmit the first transmission to the second network node, and transmit a second transmission to UE served by the first network node on the same beam. Alternatively, the first network node could transmit the first transmission to the second network node on one beam, and transmit a second transmission to UE served by the first network node on another beam(s).

In one embodiment, the first direction could be downlink, and the second direction could be uplink. The first network node could transmit the first transmission to the second network node in the first TTI with transmission direction set to downlink in the first network node, where the first TTI with transmission direction set to downlink in the first network node for the first transmission to the second network node is TTI-level aligned to a third TTI with transmission direction set to uplink in the first network node for a third transmission to the second network node. The TTI-level alignment between the first TTI and the third TTI could mean that the TTI (starting) boundary time distance of the first TTI and the third TTI is integer times of TTI length. There may be a gap or time-interval between a starting timing of the first transmission to the second network node in the first TTI with transmission direction set to downlink in the first network node and a starting boundary of the first TTI. A starting timing of the first transmission to the second network node in the first TTI with transmission direction set to downlink in the first network node could be with same gap or time-interval to TTI (starting) boundary as starting timing of a third transmission to the second network node in a third TTI with transmission direction set to uplink in the first network node.

In one embodiment, the first direction could be uplink, and the second direction could be downlink. The first network node could transmit the first transmission to the second network node in the first TTI with transmission direction set to uplink in the first network node, where the first TTI with transmission direction set to uplink in the first network node for the first transmission to the second network node is TTI-level aligned to a third TTI with transmission direction set to downlink in the first network node for a third transmission to the second network node. The TTI-level alignment between the first TTI and the third TTI could mean that the TTI (starting) boundary time distance of the first TTI and the third TTI is integer times of TTI length. A starting timing of the first transmission to the second network node in the first TTI with transmission direction set to uplink in the first network node could be with a gap or time-interval to TTI (starting) boundary. A starting timing of the first transmission to the second network node in the first TTI with transmission direction set to uplink in the first network node could be with same gap or time-interval to TTI (starting) boundary as starting timing of a third transmission to the second network node in a third TTI with transmission direction set to downlink in the first network node.

Referring back to FIGS. 3 and 4, in one exemplary embodiment of a first network node, the device 300 includes a program code 312 stored in the memory 310. The CPU 308 could execute program code 312 to enable the first network node (i) to transmit a first transmission to a second network node in a transmission occasion, wherein the transmission occasion comprises at least a first TTI or first symbol with transmission direction set to a first direction in the first network node and the transmission occasion comprises at least a second TTI or second symbol with transmission direction set to a second direction in the second network node. Furthermore, the CPU 308 can execute the program code 312 to perform all of the above-described actions and steps or others described herein.

Figure 27:
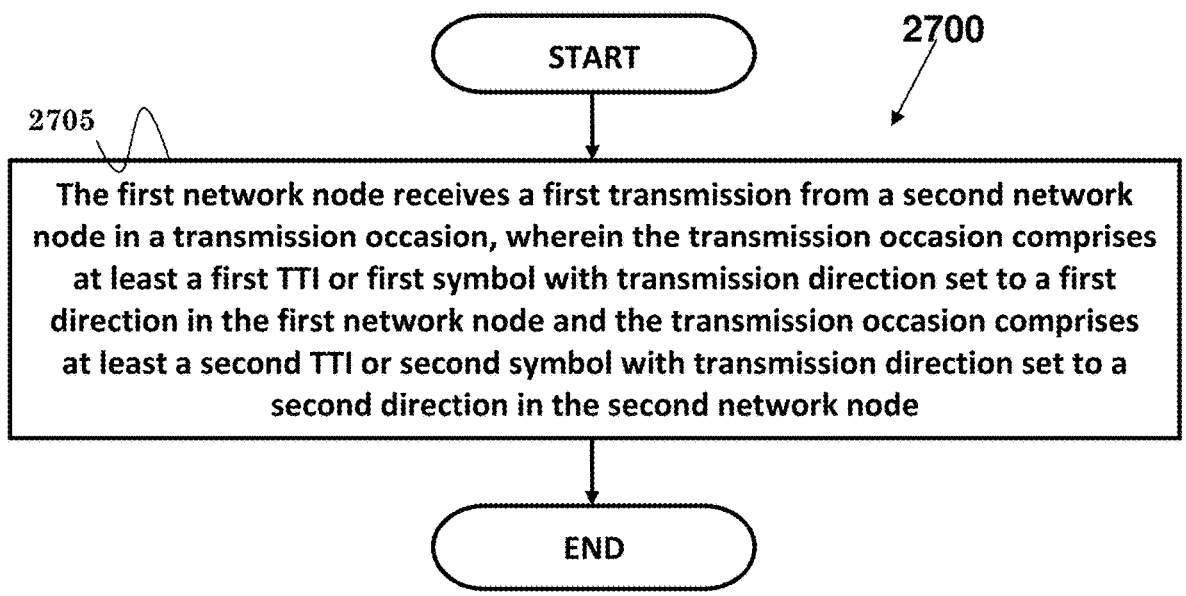
FIG. 27 is a flow chart according to one exemplary embodiment.

FIG. 27 is a flow chart 2700 according to one exemplary embodiment from the perspective of a first network node. In step 2705, the first network node receives a first transmission from a second network node in a transmission occasion, wherein the transmission occasion comprises at least a first TTI or first symbol with transmission direction set to a first direction in the first network node and the transmission occasion comprises at least a second TTI or second symbol with transmission direction set to a second direction in the second network node.

In one embodiment, the second direction could be opposite to the first direction. The first TTI or first symbol could be (at least partially) overlapped with the second TTI or second symbol in time domain.

In one embodiment, the first network node could receive a second transmission from UE served by the first network node in the transmission occasion. Alternatively, the first network node could receive the first transmission from the second network node, and a second transmission from UE served by the first network node on the same beam. Alternatively, the first network node could receive the first transmission from the second network node on one beam, and a second transmission from UE served by the first network node on another beam.

In one embodiment, the first direction could be uplink, and the second direction could be downlink. The first network node could receive the first transmission from the second network node in the first TTI with transmission direction set to uplink in the first network node, where the first TTI with transmission direction set to uplink in the first network node for receiving the first transmission from the second network node is TTI-level aligned to a third TTI with transmission direction set to downlink in the first network node for receiving a third transmission from the second network node. The TTI-level alignment between the first TTI and the third TTI could mean that the TTI (starting) boundary time distance of the first TTI and the third TTI is integer times of TTI length. There may be a gap or time-interval between a starting reception timing of the first transmission from the second network node in the first TTI with transmission direction set to uplink in the first network node and a starting boundary of the first TTI. A starting reception timing of the first transmission from the second network node in the first TTI with transmission direction set to uplink in the first network node could be with same gap or time-interval to TTI (starting) boundary as starting reception timing of a third transmission from the second network node in a third TTI with transmission direction set to downlink in the first network node.

In one embodiment, the first direction could be downlink, and the second direction could be uplink. The first network node could receive the first transmission from the second network node in the first TTI with transmission direction set to downlink in the first network node, where the first TTI with transmission direction set to downlink in the first network node for receiving the first transmission from the second network node is TTI-level aligned to a third TTI with transmission direction set to uplink in the first network node for receiving a third transmission from the second network node. The TTI-level alignment between the first TTI and the third TTI could mean that the TTI (starting) boundary time distance of the first TTI and the third TTI is integer times of TTI length. There may be a gap or time-interval between a starting reception timing of the first transmission from the second network node in the first TTI with transmission direction set to downlink in the first network node and a starting boundary of the first TTI. A starting reception timing of the first transmission from the second network node in the first TTI with transmission direction set to downlink in the first network node could be with same gap or time-interval to TTI (starting) boundary as starting reception timing of a third transmission from the second network node in a third TTI with transmission direction set to uplink in the first network node.

Referring back to FIGS. 3 and 4, in one exemplary embodiment of a first network node, the device 300 includes a program code 312 stored in the memory 310. The CPU 308 could execute program code 312 to enable the first network node to receive a first transmission from a second network node in a transmission occasion, wherein the transmission occasion comprises at least a first TTI or first symbol with transmission direction set to a first direction in the first network node and the transmission occasion comprises at least a second TTI or second symbol with transmission direction set to a second direction in the second network node. Furthermore, the CPU 308 can execute the program code 312 to perform all of the above-described actions and steps or others described herein.

In the context of the embodiments illustrated in FIGS. 26 and 27 and discussed above, the first network node could be a relay node, a relay TRP, an anchor node, or a donor gNB. The second network node could be a relay node, a relay TRP, an anchor node, or a donor gNB.

Figure 28:
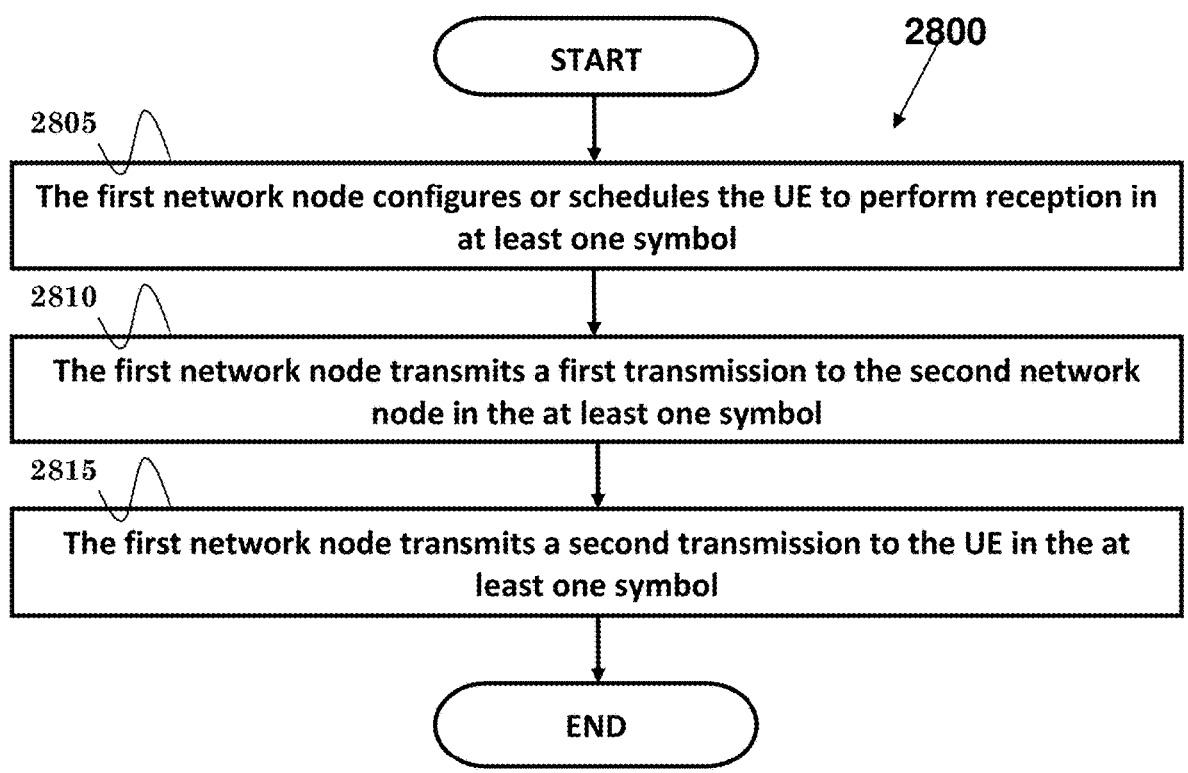
FIG. 28 is a flow chart according to one exemplary embodiment.

FIG. 28 is a flow chart 2800 according to one exemplary embodiment from the perspective of a first network node served by a second network node, wherein the first network node serves a UE. In step 2805, the first network node configures or schedules the UE to perform reception in at least one symbol. In one embodiment, the at least one symbol could be with transmission direction set to downlink in the first network node.

In step 2810, the first network node transmits a first transmission to the second network node in the at least one symbol. In step 2815, the first network node transmits a second transmission to the UE in the at least one symbol.

In one embodiment, the first network node could transmit the second transmission to the UE in a TTI with transmission direction set to downlink in the first network node. The first network node could transmit the first transmission to the second network node, and the second transmission to the UE on the same beam. Alternatively, the first network node could transmit the first transmission to the second network node on one beam, and the second transmission to the UE on another beam(s).

In one embodiment, the first network node could schedule the UE to perform reception via a control signalling.

In one embodiment, the first network node could be a relay node or a relay TRP. The second network node could be an anchor node or donor gNB or a relay node or TRP (with hop level higher than the first network node).

Referring back to FIGS. 3 and 4, in one exemplary embodiment of a first network node served by a second network node, wherein the first network node serves a UE, the device 300 includes a program code 312 stored in the memory 310. The CPU 308 could execute program code 312 to enable the first network node (i) to configure or schedule the UE to perform reception in at least one symbol, (ii) to transmit a first transmission to the second network node in the at least one symbol, and (iii) to transmit a second transmission to the UE in the at least one symbol. Furthermore, the CPU 308 can execute the program code 312 to perform all of the above-described actions and steps or others described herein.

Figure 29:
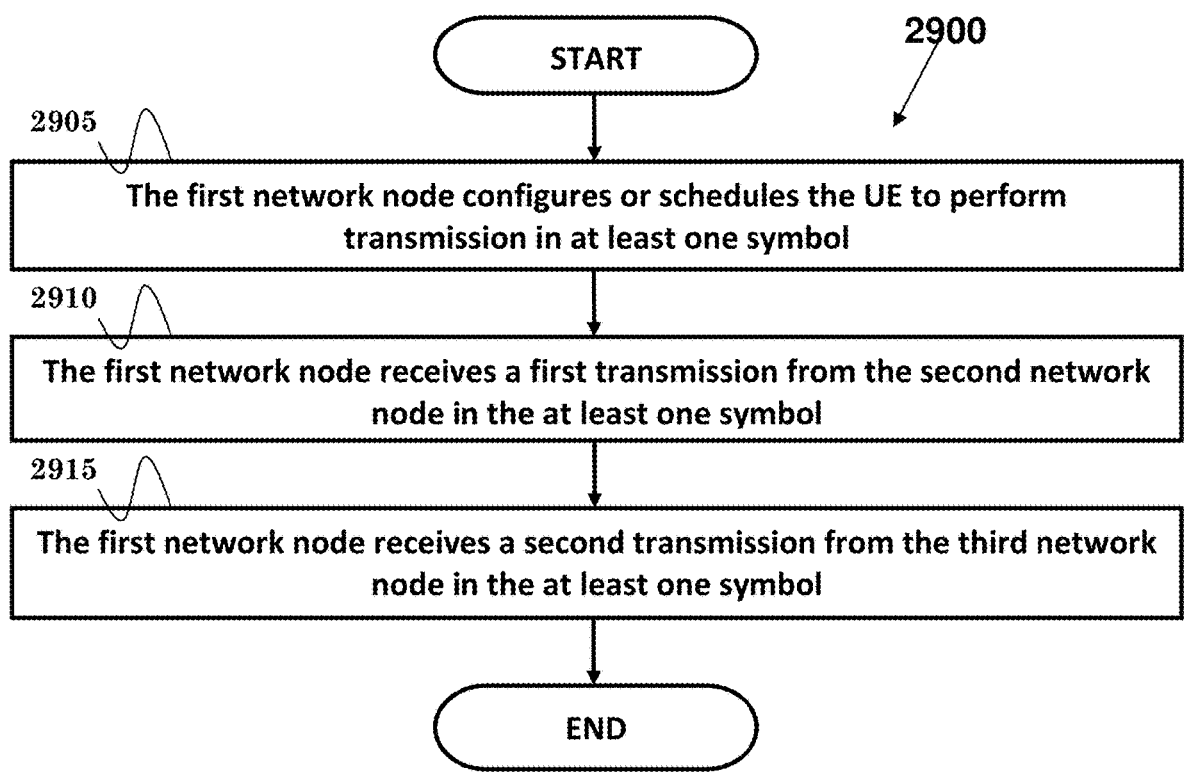
FIG. 29 is a flow chart according to one exemplary embodiment.

FIG. 29 is a flow chart 2900 according to one exemplary embodiment from the perspective of a first network node served by a second network node, wherein the first network node serves a UE. In step 2905, the first network node configures or schedules the UE to perform transmission in at least one symbol. In one embodiment, the at least one symbol could be with transmission direction set to uplink in the first network node.

In step 2910, the first network node receives a first transmission from the second network node in the at least one symbol. In step 2915, the first network node receives a second transmission from the third network node in the at least one symbol.

In on embodiment, the first network node could receive the second transmission from the UE in a TTI with transmission direction set to uplink in the first network node. The first network node could receive the first transmission from the second network node, and the second transmission from the UE on the same beam. Alternatively, the first network node could receive the first transmission from the second network node on one beam, and the second transmission from the UE on another beam(s).

In one embodiment, the first network node could schedule the UE to perform transmission via a control signalling.

In one embodiment, the first network node could be a relay node or a relay TRP. The second network node could be an anchor node or donor gNB or a relay node or TRP (with hop level higher than the first network node).

Referring back to FIGS. 3 and 4, in one exemplary embodiment of a first network node served by a second network node, wherein the first network node serves a UE, the device 300 includes a program code 312 stored in the memory 310. The CPU 308 could execute program code 312 to enable the first network node (i) to configure or schedule the UE to perform transmission in at least one symbol, (ii) to receive a first transmission from the second network node in the at least one symbol, and (iii) to receive a second transmission from the third network node in the at least one symbol. Furthermore, the CPU 308 can execute the program code 312 to perform all of the above-described actions and steps or others described herein.

In the context of the embodiments illustrated in FIGS. 26-29 and discussed above, in one embodiment, the first network node may not be a UE. The second network node may not be a UE.

In one embodiment, the first transmission between the first network node and the second network node could be node-to-node transmission. The first transmission between the first network node and the second network node could be transmitted in a backhaul link. The second transmission between the first network node and the UE served by the first network node could be transmitted in an access link.

In one embodiment, the transmission direction setting in the first network node could mean the transmission direction in access link, or the transmission direction between the first network node and the UE served by the first network node. The transmission direction setting in the first network node may not mean the transmission direction in backhaul link. The transmission direction setting in the first network node may not mean the transmission direction between the first network node and the second network node.

In one embodiment, the UE served by the first network node could monitor or receive the second transmission from the first network node in a TTI or symbol with transmission direction set to downlink in the first network node. The UE served by the first network node could transmit the second transmission to the first network node in a TTI or symbol with transmission direction set to uplink in the first network node.

In one embodiment, the first network node could transmit the second transmission to the UE served by the first network node in a TTI or symbol with transmission direction set to downlink in the first network node. The first network node could receive the second transmission from the UE served by the first network node in a TTI or symbol with transmission direction set to uplink in the first network node.

In one embodiment, a TTI could mean a slot, a mini-slot, a sub-slot, a subframe, or an one-time unit of transmission. A TTI could comprise multiple symbols. In other words, a TTI could comprise at least one symbol.

In one embodiment, the gap or time-interval to TTI (starting) boundary could be configured or could be indicated by signaling.

In one embodiment, the TTI boundary of the first TTI with transmission direction set to downlink in the first network node could be aligned to TTI boundary of the second TTI with transmission direction set to downlink in the second network node. Alternatively, the TTI boundary of the first TTI with transmission direction set to downlink in the first network node could be aligned to TTI boundary of the second TTI with transmission direction set to uplink in the second network node. Alternatively, the TTI boundary of the first TTI with transmission direction set to uplink in the first network node could be aligned to TTI boundary of the second TTI with transmission direction set to downlink in the second network node. Alternatively, the TTI boundary of the first TTI with transmission direction set to uplink in the first network node could be aligned to TTI boundary of the second TTI with transmission direction set to uplink in the second network node.

In one embodiment, the first network node served by the second network node could mean that the first network node transmits or receives the first transmission to or from the second network node based on scheduling or configuration indicated by the second network node. The UE served by the first network node could mean that the UE transmits or receives the second transmission to or from the first network node based on scheduling or configuration indicated by the first network node.

In one embodiment, the hop level could mean the hop times between a relay node or a relay TRP and an anchor node or a donor gNB in backhaul link. A relay node or a relay TRP with higher hop level could mean the smaller or nearer hop times to anchor node or a donor gNB. A relay node or a relay TRP with lower hop level means the larger or further hop times to anchor node or a donor gNB.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first network node in a wireless communication system, comprising:
   the first network node transmits a second transmission to a UE (User Equipment) in at least a first symbol of a first TTI (Transmission Time Interval); and
   the first network node transmits, via a backhaul link, a first transmission to a second network node in at least a second symbol of a second TTI,
   wherein the first TTI associated with the second transmission from the first network node to the UE is TTI-level aligned to the second TTI associated with the first transmission from the first network node to the second network node,
   wherein the first symbol is at least partially overlapped with the second symbol in time domain,
   wherein the first symbol is set to downlink in the first network node,
   wherein the second symbol is set to uplink in the second network node, and
   wherein a starting boundary of the first TTI associated with the second transmission from the first network node to the UE is aligned to a starting boundary of the second TTI associated with the first transmission from the first network node to the second network node.

2. The method of claim 1, wherein the first TTI is set to a first direction in the first network node, and the second TTI is set to a second direction in the second network node.

3. The method of claim 2, wherein the second direction is opposite to the first direction.

4. The method of claim 1, wherein the first network node transmits the first transmission to the second network node and transmits the second transmission to the UE on the same beam.

5. The method of claim 1, wherein there is a gap or time-interval between the starting boundary of the second TTI and a starting timing of the first transmission to the second network node.

6. The method of claim 1, wherein at least one of the first TTI or the second TTI means a slot.

7. The method of claim 1, wherein the first network node is a relay node, and the second network node is a donor node or parent node of the first network node.

8. The method of claim 1, where the UE is served by the first network node.

9. A first network node in a wireless communication system, comprising:
   a processor; and
   a memory coupled to the processor;
   wherein the processor is configured to execute a program code stored in the memory to:
   transmit a second transmission to a UE (User Equipment) in at least a first symbol of a first TTI (Transmission Time Interval); and
   transmit, via a backhaul link, a first transmission to a second network node in at least a second symbol of a second TTI;
   wherein the first TTI associated with the second transmission from the first network node to the UE is TTI-level aligned to the second TTI associated with the first transmission from the first network node to the second network node,
   wherein the first symbol is at least partially overlapped with the second symbol in time domain,
   wherein the first symbol is set to downlink in the first network node,
   wherein the second symbol is set to uplink in the second network node, and
   wherein a starting boundary of the first TTI associated with the second transmission from the first network node to the UE is aligned to a starting boundary of the second TTI associated with the first transmission from the first network node to the second network node.

10. The first network node of claim 9 wherein the first TTI is set to a first direction in the first network node, and the second TTI is set to a second direction in the second network node.

11. The first network node of claim 10, wherein the second direction is opposite to the first direction.

12. The first network node of claim 9, wherein the UE is served by the first network node.

13. The first network node of claim 9, wherein the first network node transmits the first transmission to the second network node and transmits the second transmission to the UE on the same beam.

14. The first network node of claim 9, wherein there is a gap or time-interval between the starting boundary of the second TTI and a starting timing of the first transmission to the second network node.

15. The first network node of claim 9, wherein at least one of the first TTI or the second TTI means a slot.

16. The first network node of claim 9, wherein the first network node is a relay node, and the second network node is a donor node or parent node of the first network node.

17. The method of claim 1, wherein the first TTI and the second TTI are the same TTI.

18. The first network node of claim 9, wherein the first TTI and the second TTI are the same TTI.

19. The method of claim 1, wherein the TTI-level alignment of the first TTI to the second TTI corresponds to a boundary time distance of the first TTI and the second TTI being integer times of TTI length.

20. The method of claim 19, wherein the integer is zero.

21. The first network node of claim 9, wherein the TTI-level alignment of the first TTI to the second TTI corresponds to a boundary time distance of the first TTI and the second TTI being integer times of TTI length.

22. The first network node of claim 21, wherein the integer is zero.

* * * * *